United States Patent
Kato

(10) Patent No.: US 9,804,317 B2
(45) Date of Patent: Oct. 31, 2017

(54) DISPLAY APPARATUS

(71) Applicant: Japan Display Inc., Tokyo (JP)

(72) Inventor: Hirofumi Kato, Tokyo (JP)

(73) Assignee: Japan Display Inc., Tokyo (JP)

( * ) Notice: Subject to any disclaimer, the term of this patent is extended or adjusted under 35 U.S.C. 154(b) by 87 days.

(21) Appl. No.: 15/011,936

(22) Filed: Feb. 1, 2016

(65) Prior Publication Data

US 2016/0231497 A1 Aug. 11, 2016

(30) Foreign Application Priority Data

Feb. 6, 2015 (JP) .................................. 2015-022019
Oct. 13, 2015 (JP) .................................. 2015-202214

(51) Int. Cl.
 *G09G 5/02* (2006.01)
 *F21V 8/00* (2006.01)
 (Continued)

(52) U.S. Cl.
 CPC ......... *G02B 6/0035* (2013.01); *G02B 6/0083* (2013.01); *G02F 1/1326* (2013.01); *G02F 1/1334* (2013.01); *G09G 3/3406* (2013.01); *G09G 3/3473* (2013.01); *G09G 2320/0646* (2013.01)

(58) Field of Classification Search
 USPC ........... 345/204, 207, 697, 8, 695, 690, 694; 362/84, 607, 619
 See application file for complete search history.

(56) References Cited

U.S. PATENT DOCUMENTS 9,599,292 B2 * 3/2017 Jagt ........................ H01L 33/507
2002/0033909 A1 3/2002 Hiyama et al.
(Continued)

FOREIGN PATENT DOCUMENTS

JP         5421276 B2    2/2014
JP    2014-071204 A    4/2014
(Continued)

OTHER PUBLICATIONS

Korean Office Action (with English translation) dated Jan. 18, 2017 in corresponding Korean application No. 10-2016-0013386 (23 pages).
(Continued)

*Primary Examiner* — Thuy Pardo
(74) *Attorney, Agent, or Firm* — K&L Gates LLP

(57) ABSTRACT

A display apparatus includes an image display panel, a light source device, and a control device. The light source device includes a light source that emits light and a light guide member arranged on the back surface side of the panel as seen from the display surface, receives the light via its side surface with respect to its surface facing the panel, and has divided areas arranged in a direction in which the light travels. Each area includes a light modulation layer brought in a light transmission state or in a light scattering state. The control device brings the layers in the scattering state in respective scattering control periods temporally different from each other. When bringing a light modulation layer in the scattering state, the control device controls the light source device with a drive pattern based on a distance between the side surface and the corresponding area.

15 Claims, 24 Drawing Sheets

(51) Int. Cl.
*G02F 1/13* (2006.01)
*G02F 1/1334* (2006.01)
*G09G 3/34* (2006.01)

(56) References Cited

U.S. PATENT DOCUMENTS

| | | |
|---|---|---|
| 2008/0266332 A1 | 10/2008 | Inoue et al. |
| 2011/0169877 A1 | 7/2011 | Ishida |
| 2011/0181635 A1* | 7/2011 | Kabe .................... G09G 3/3426 345/694 |
| 2013/0279192 A1* | 10/2013 | Chang .................... G02B 6/005 362/607 |
| 2013/0334559 A1* | 12/2013 | Vdovin ................. H01L 33/507 257/98 |
| 2014/0092001 A1 | 4/2014 | Kikkawa |
| 2014/0139461 A1 | 5/2014 | Furukawa et al. |
| 2014/0160796 A1* | 6/2014 | He ....................... G02B 6/0063 362/619 |
| 2014/0347410 A1* | 11/2014 | Higashi ................ G09G 3/3426 345/695 |
| 2015/0009649 A1* | 1/2015 | Jagt ........................ H01L 33/507 362/84 |
| 2015/0219897 A1* | 8/2015 | Mukawa ............... G02F 1/1334 345/8 |
| 2015/0325163 A1* | 11/2015 | Kobayashi .......... G02F 1/13476 345/690 |
| 2016/0282544 A1* | 9/2016 | He ....................... G02B 6/0063 |
| 2016/0380166 A1* | 12/2016 | Reiss .................. H01L 25/0753 257/88 |

FOREIGN PATENT DOCUMENTS

| | | |
|---|---|---|
| JP | 2014-102295 | 6/2014 |
| KR | 10-2002-0011855 A | 2/2002 |
| WO | 2008/136358 | 11/2008 |

OTHER PUBLICATIONS

Korean Office Action (with English translation) dated Jun. 9, 2017 in corresponding Korean application No. 10-2016-0013386 (15 pages).

* cited by examiner

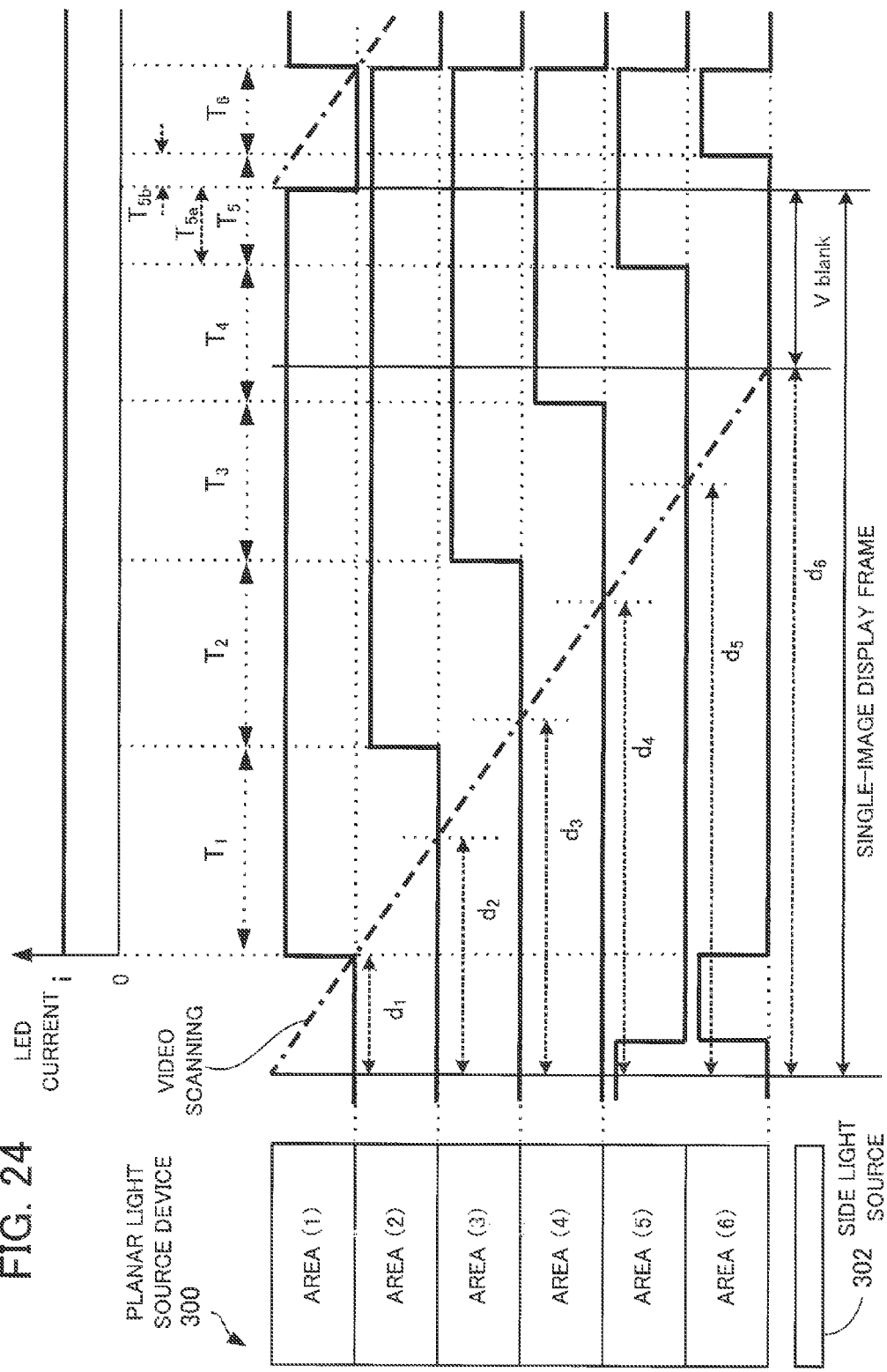

DISPLAY APPARATUS

CROSS REFERENCES TO RELATED APPLICATIONS

This application is based upon and claims the benefit of priority of the prior Japanese Patent Application No. 2015-022019, filed on Feb. 6, 2015, and the Japanese Patent Application No. 2015-202214, filed on Oct. 13, 2015, the entire contents of which are incorporated herein by reference.

BACKGROUND

The embodiments discussed herein relate to a display apparatus.

There are display apparatuses that include edge-light-type light source devices. Such a light source device includes a light guide plate and is capable of performing partial drive in order to achieve high-contrast image display, low power consumption, etc. The partial drive is an operation in which white light is guided into the light guide plate and part of the light is emitted from the light guide plate. For display apparatuses including these light source devices, there has been proposed a technique for improving defocused moving images displayed on the display apparatuses, without increasing the power consumption.

See, for example, Japanese Laid-open Patent Publication No. 2014-102295.

SUMMARY

According to one aspect, there is provided a display apparatus that prevents deterioration in image quality.

According to one aspect, there is provided a display apparatus including: an image display panel; a light source device that includes a light source that emits light, and a light guide member that is arranged on a back surface side of the image display panel as seen from a display surface of the image display panel, receives the light via a side surface of the light guide member with respect to a surface of the light guide member, the surface facing the image display panel, and has a plurality of divided areas arranged in a direction in which the light travels, each of the areas including a light modulation layer brought in a transmission state in which the light is transmitted through the light modulation layer or in a scattering state in which the light is scattered in the light modulation layer; and a control device that brings the light modulation layers of the areas in the scattering state in respective scattering control periods temporally different from each other and that controls, when bringing any one of the light modulation layers in the scattering state, the light source device with a drive pattern based on a distance between the side surface and the area including the light modulation layer.

The object and advantages of the invention will be realized and attained by means of the elements and combinations particularly pointed out in the claims.

It is to be understood that both the foregoing general description and the following detailed description are exemplary and explanatory and are not restrictive of the invention.

Additional features and advantages are described herein, and will be apparent from the following Detailed Description and the figures.

BRIEF DESCRIPTION OF THE FIGURES

FIG. 24 illustrates a drive pattern of a planar light source device according to a tenth embodiment.

DETAILED DESCRIPTION

Figure 1:
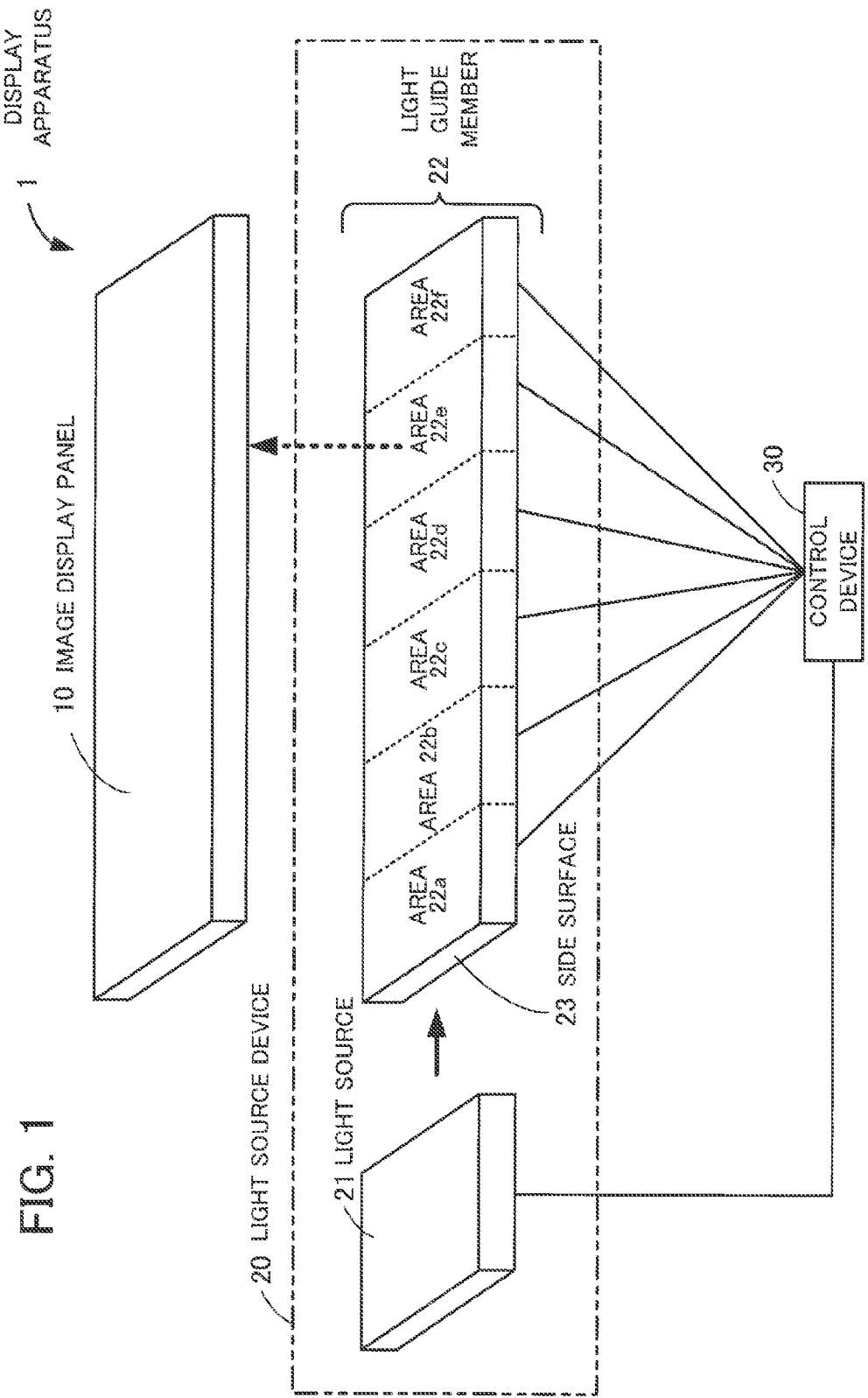
FIG. 1 illustrates an example of a configuration of a display apparatus according to a first embodiment.

Several embodiments will be described below with reference to the accompanying documents, wherein like reference numerals refer to like elements throughout.

In addition, it should be understood that the present description serves only as an example and that the scope of the invention of course includes suitable changes that a person skilled in the art could easily arrive at within the gist of the invention. In addition, for further clarification of the description, an individual element in the drawings is illustrated more schematically in its width, thickness, shape, etc. than when it is embodied. However, the elements illustrated in the drawings are merely examples and do not limit the interpretation of the invention.

In addition, in the present description and drawings, if an element in a drawing has already been described in any one of the previous drawings, the element is denoted by the same reference character, and detailed description of the element is omitted as needed.

First Exemplary Embodiment

A display apparatus according to a first embodiment will be described with reference to FIG. 1. FIG. 1 illustrates an example of a configuration of a display apparatus 1 according to the first embodiment.

The display apparatus 1 includes an image display panel 10, a light source device 20, and a control device 30.

The image display panel 10 displays predetermined images. The light source device 20 emits light to the image display panel 10. The light source device 20 includes a light source 21 and a light guide member 22. The light source 21 emits light.

The light guide member 22 is arranged on the back surface side of the image display panel 10 as seen from the display surface, receives the light emitted from the light source 21 via a side surface 23 with respect to a surface of the light guide member 22, the surface facing the image display panel 10, and emits the light to the image display panel 10. The light guide member 22 has a plurality of divided areas (22a to 22f) arranged in a direction in which the light travels, each of the areas including a light modulation layer brought in a transmission state in which the light is transmitted through the light modulation layer or in a scattering state in which the light is scattered in the light modulation layer.

For example, an individual light modulation layer is a polymer-dispersed liquid crystal layer. When an electric field is applied in a light modulation layer, the light modulation layer is brought in the scattering state. Otherwise, the light modulation layer is maintained in the transmission state. Thus, when the light modulation layer of an area is in the transmission state, the light is transmitted through this area and travels to its neighboring area (in the direction in which the light travels). When the light modulation layer of an area is in the scattering state, the light is scattered in this light modulation layer, and part of the scattered light is emitted from this area to the image display panel 10.

The control device 30 controls the light source device 20. The control device 30 applies an electric field in the light modulation layer of the areas in respective scattering control periods. In this way, the control device 30 brings the light modulation layers of the areas in the scattering state. The scattering control periods of the light modulation layers of the areas are set so that any one of the scattering control periods does not temporally overlap the other scattering control periods (the scattering control periods are sequentially given to the respective light modulation layers). Namely, the control device 30 sequentially brings the light modulation layers of the areas in the scattering state so that no two scattering control periods temporally overlap (the control device 30 brings the light modulation layer of only one area in the scattering state at one time).

In this way, the control device 30 maintains the light modulation layers of the areas in the scattering state in the respective scattering control periods. Namely, the light source device 20 performs partial drive in which the light modulation layers of the areas are sequentially brought in the scattering state and the areas sequentially emit light to the image display panel 10.

Next, a specific example in which the control device 30 brings the light modulation layers of the areas in the scattering state in the respective scattering control periods and the light source device 20 performs the partial drive will be described. For example, when the control device 30 applies an electric field in the light modulation layer of the area 22b and brings this light modulation layer in the scattering state, after the light emitted from the light source 21 enters the light guide member 22 via the side surface 23, the light passes through the area 22a whose light modulation layer is in the transmission state. Next, the light emitted from the light source 21 is scattered in the area 22b whose light modulation layer is in the scattering state. Of all the scattered light, the light traveling in the direction of the image display panel 10 is emitted from the area 22b to the image display panel 10.

When the control device 30 applies an electric field in the light modulation layer of the area 22e and brings this light modulation layer in the scattering state, after the light emitted from the light source 21 enters the light guide member 22 via the side surface 23, the light passes through the areas 22a to 22d whose light modulation layers are in the transmission state. Next, the light emitted from the light source 21 is scattered in the area 22e whose light modulation layer is in the scattering state. Of all the scattered light, the light traveling in the direction of the image display panel 10 is emitted from the area 22e to the image display panel 10.

Thus, if the area that emits the light to the image display panel 10 is located farther from the side surface 23, the light emitted from the light source 21 passes through more areas until being emitted from the light guide member 22. However, it is known that the intensity of the light could change (attenuate) as the light passes through an area. For example, the intensity of the light is the luminance or brightness of the light.

Thus, if the control device 30 causes the light source device 20 to perform partial drive by applying the same drive conditions to all the areas, each of the areas of the light guide member 22 could emit light having a different intensity level. Therefore, it is desirable that the control device 30 perform a different control operation per area.

To address this, when the control device 30 brings any one of the light modulation layers of the areas in the scattering state in the corresponding scattering control period, the control device 30 controls the light source device 20 with a drive pattern based on the distance between the side surface 23 and the area including the light modulation layer. As a drive pattern of the light source device 20, the control device 30 controls the intensity of the light emitted from the light source 21. As another drive pattern, the control device 30 controls the duration of the period in which the target light modulation layer is maintained in the scattering state. As another drive pattern, the control device 30 controls the scattering degree of the scattering state of the target light modulation layer.

For example, while the control device 30 sets the same conditions as to the intensity of the light emitted from the light source 21 and the duration of the period in which the target light modulation layer is maintained in the scattering state regardless of area, the control device 30 changes the intensity of the electric field applied to bring the target light modulation layer in the scattering state, on the basis of the distance between the side surface 23 and the target area whose light modulation layer is brought in the scattering state.

More specifically, to cause each of the areas to emit light having a predetermined intensity, the control device 30 controls the intensity of the electric field so that the scattering degree of the scattering state of the target light modulation layer is increased with the increase of the distance between the side surface 23 and the target area whose light modulation layer is brought in the scattering state. In this way, the farther the area from the side surface 23 is, the more the light scattering is performed in the corresponding light modulation layer. Consequently, with the increase of the distance between the side surface 23 and the target area, the control device 30 causes the target area to emit more light, of all the light that has reached the target area.

Alternatively, while the control device 30 sets the same conditions as to the scattering degree of the scattering state of the target light modulation layer and the duration of the period in which the target light modulation layer is maintained in the scattering state regardless of area, the control device 30 may change the intensity of the light emitted from the light source 21, on the basis of the distance between the side surface 23 and the target area whose light modulation layer is brought in the scattering state.

More specifically, to cause each of the areas to emit light having a predetermined intensity, the control device 30 controls the light source device 20 so that the light source 21 emits light having a greater intensity with the increase of the distance between the side surface 23 and the target area whose light modulation layer is brought in the scattering state.

Alternatively, while the control device 30 sets the same conditions as to the scattering degree of the scattering state of the target light modulation layer and the intensity of the light emitted from the light source 21 regardless of area, the control device 30 may change the duration of the period in which an electric field for bringing the target light modulation layer in the scattering state is applied, on the basis of the distance between the side surface 23 and the target area whose light modulation layer is brought in the scattering state. More specifically, to cause each of the areas to emit light having a predetermined intensity, the control device 30 controls the duration of the period in which the electric field is applied so that the period in which the target light modulation layer is maintained in the scattering state is increased with the increase of the distance between the side surface 23 and the target area whose light modulation layer is brought in the scattering state.

As described above, when bringing a light modulation layer in the scattering state, the control device 30 controls the light source device 20 with a drive pattern based on the distance between the side surface 23 and the area including the light modulation layer. In this way, the control device 30 corrects the light intensity attenuation attributable to the distance.

Thus, when the control device 30 causes the light source device 20 to perform partial drive, the control device 30 prevents the intensity of the light emitted from an individual area from deviating from a desired intensity. Consequently, the display apparatus 1 prevents deterioration in image quality.

Second Exemplary Embodiment

The display apparatus 1 according to the first embodiment will be described more specifically in a second embodiment.

Figure 2:
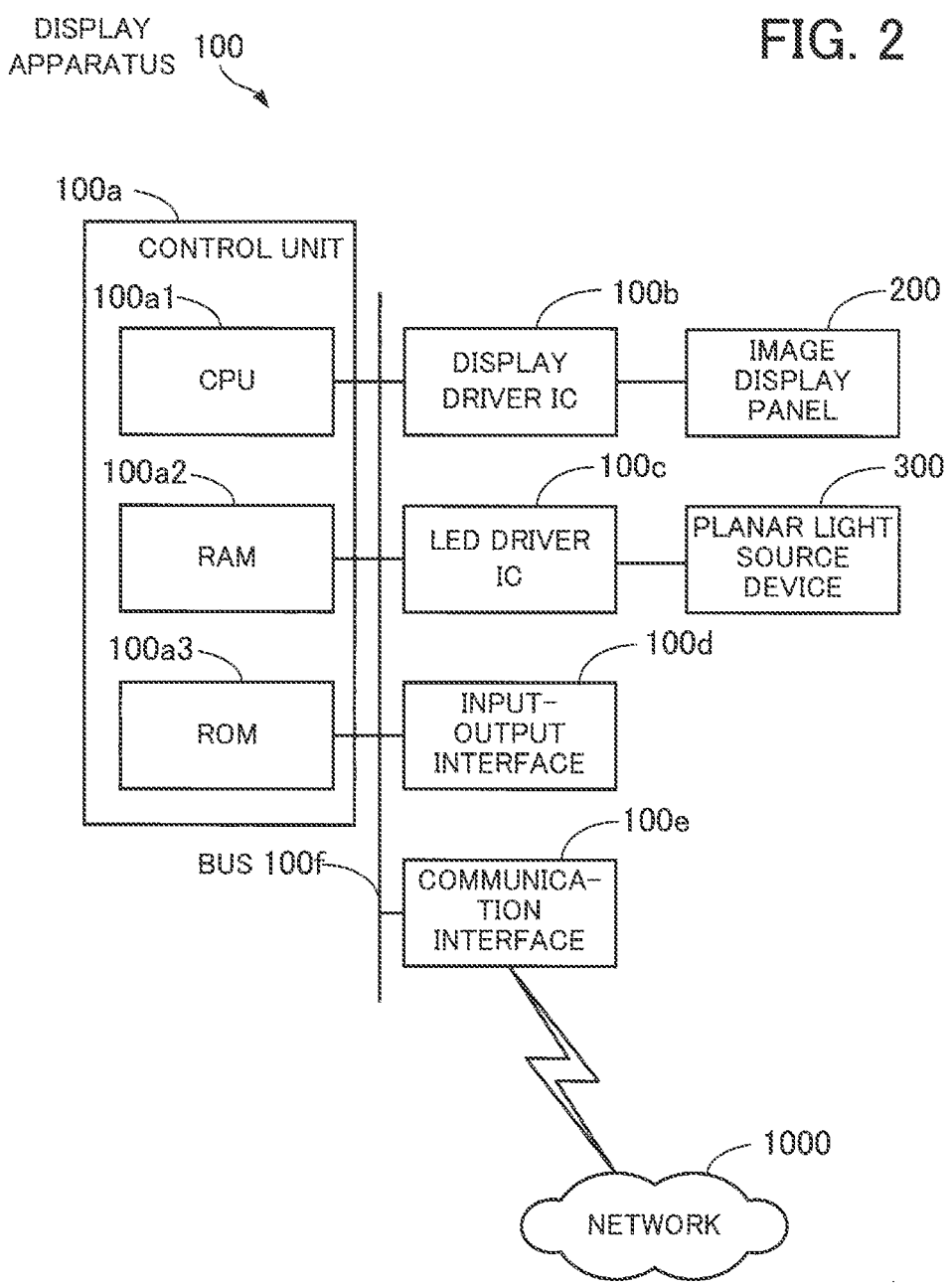
FIG. 2 illustrates an example of a hardware configuration of a display apparatus according to a second embodiment.

First, an example of a hardware configuration of a display apparatus 100 according to the second embodiment will be described with reference to FIG. 2. FIG. 2 illustrates an example of a hardware configuration of the display apparatus 100 according to the second embodiment.

The display apparatus 100 is an embodiment of the display apparatus 1 illustrated in FIG. 1 and is comprehensively controlled by a control unit 100*a*.

The control unit 100*a* includes a central processing unit (CPU) 100*a*1, a random access memory (RAM) 100*a*2, and a read-only memory (ROM) 100*a*3, which are connected to a plurality of peripheral devices via a bus 100*f*, so as to exchange signals.

The CPU 100*a*1 comprehensively controls the display apparatus 100 on the basis of an operating system (OS) program or an application program stored in the ROM 100*a*3 or various types of data stored in the RAM 100*a*2. When performing processing, the CPU 100*a*1 may control the display apparatus 100 on the basis of an OS program or an application program temporarily stored in the RAM 100*a*2.

The RAM 100*a*2 is used as a main storage device of the control unit 100*a*. At least a part of an OS program or an application program executed by the CPU 100*a*1 is temporarily stored in the RAM 100*a*2. In addition, various types of data needed by the CPU 100*a*1 to perform processing is stored in the RAM 100*a*2.

The ROM 100*a*3 is a read-only semiconductor memory device and holds an OS program, an application program, and fixed data that is not overwritten. In place of or in addition to the ROM 100*a*3, a semiconductor memory device such as a flash memory may be used as a secondary storage device.

Examples of the peripheral devices connected to the bus 100*f* include a display driver integrated circuit (IC) 100*b*, a light emitting diode (LED) driver IC 100*c*, an input and output interface 100*d*, and a communication interface 100*e*.

The display driver IC 100*b* is connected to the image display panel 200. The display driver IC 100*b* outputs an output signal to the image display panel 200, and the image display panel 200 displays an image based on the output signal. The display driver IC 100*b* may be configured to realize at least a part of the functions of an image display panel drive unit described below.

The LED driver IC 100*c* is connected to a planar light source device 300 (an embodiment of the light source device 20 according to the first embodiment). The LED driver IC 100*c* drives a light source on the basis of a light source control signal described below and controls the luminance of the planar light source device 300. The LED driver IC 100*c* realizes at least a part of the functions of a planar light source device drive unit described below (an embodiment of the control device 30 according to the first embodiment).

The input and output interface 100*d* is connected to an input device that receives instructions from users. Examples of the input device include a keyboard, a mouse, and a touch panel used as pointing devices. The input and output interface 100*d* forwards signals transmitted from the input device to the CPU 100*a*1.

The communication interface 100*e* is connected to a network 1000. The communication interface 100*e* exchanges data with another computer or communication device via the network 1000.

The above hardware configuration realizes processing functions according to the present embodiment.

Next, an example of a configuration of the planar light source device 300 will be described with reference to FIGS.

Figure 3:
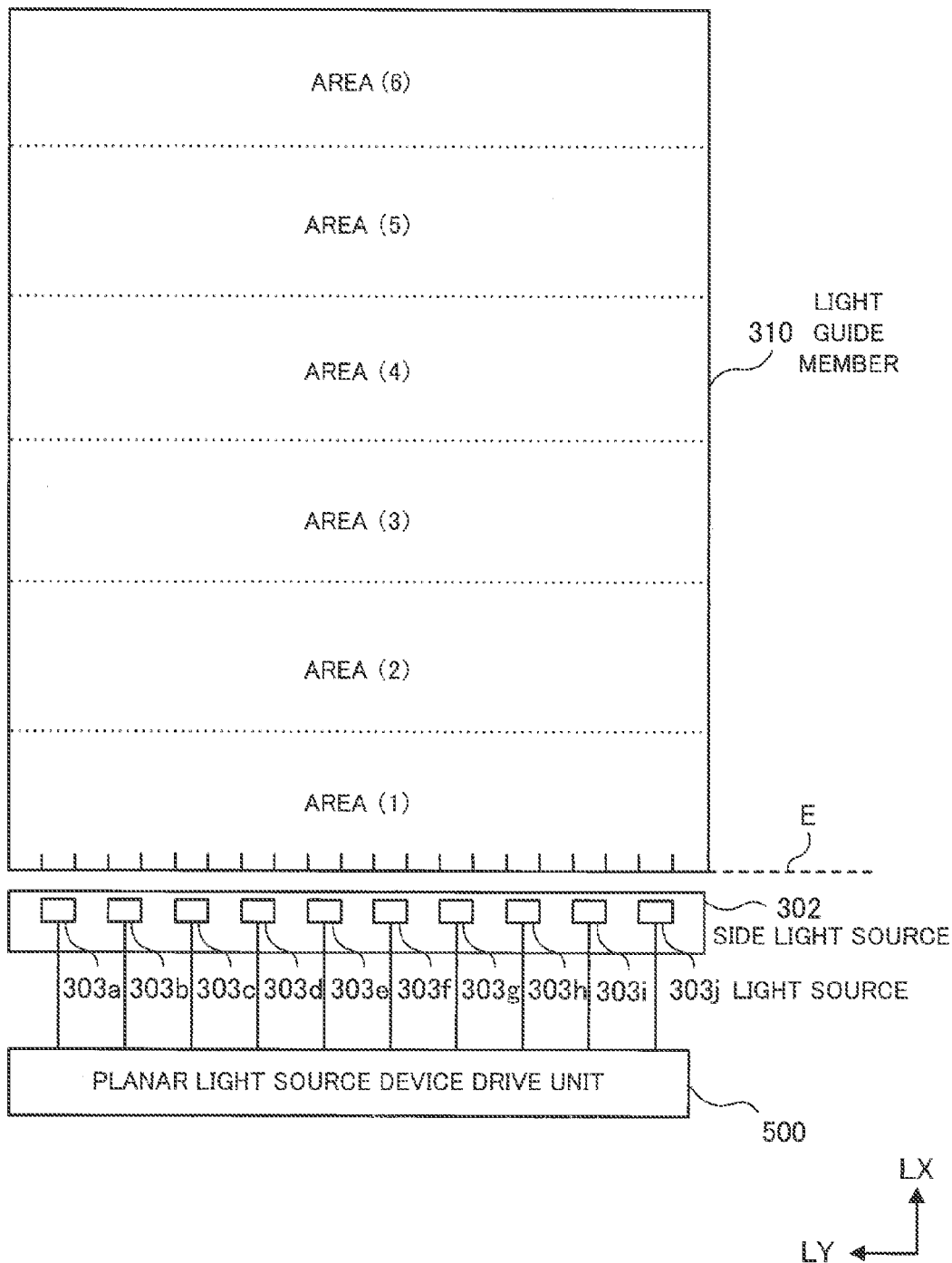
FIG. 3 is a plan view illustrating an example of a configuration of a planar light source device according to the second embodiment.
Figure 4:
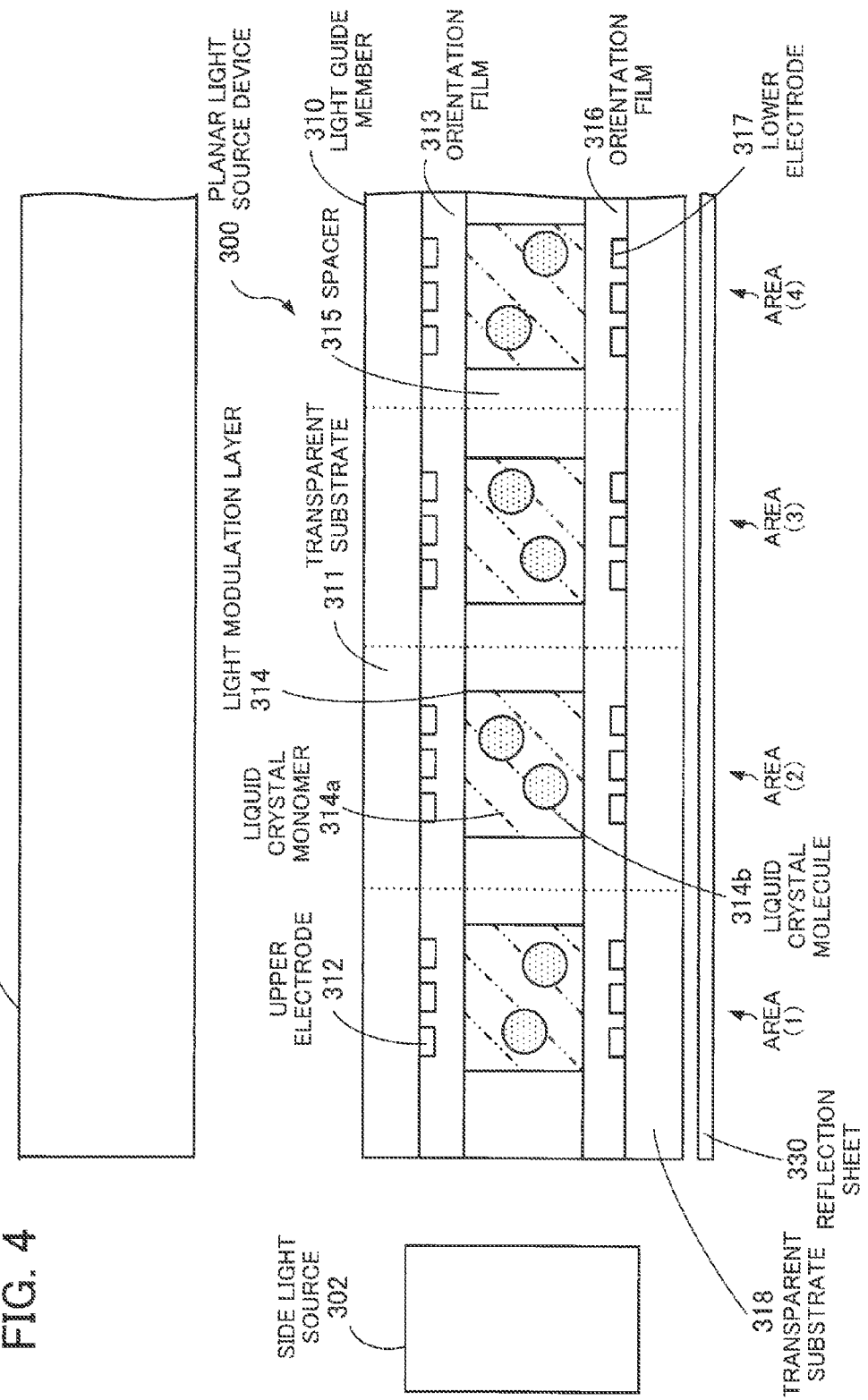
FIG. 4 is a sectional view illustrating an example of a configuration of the planar light source device according to the second embodiment.
Figure 5:
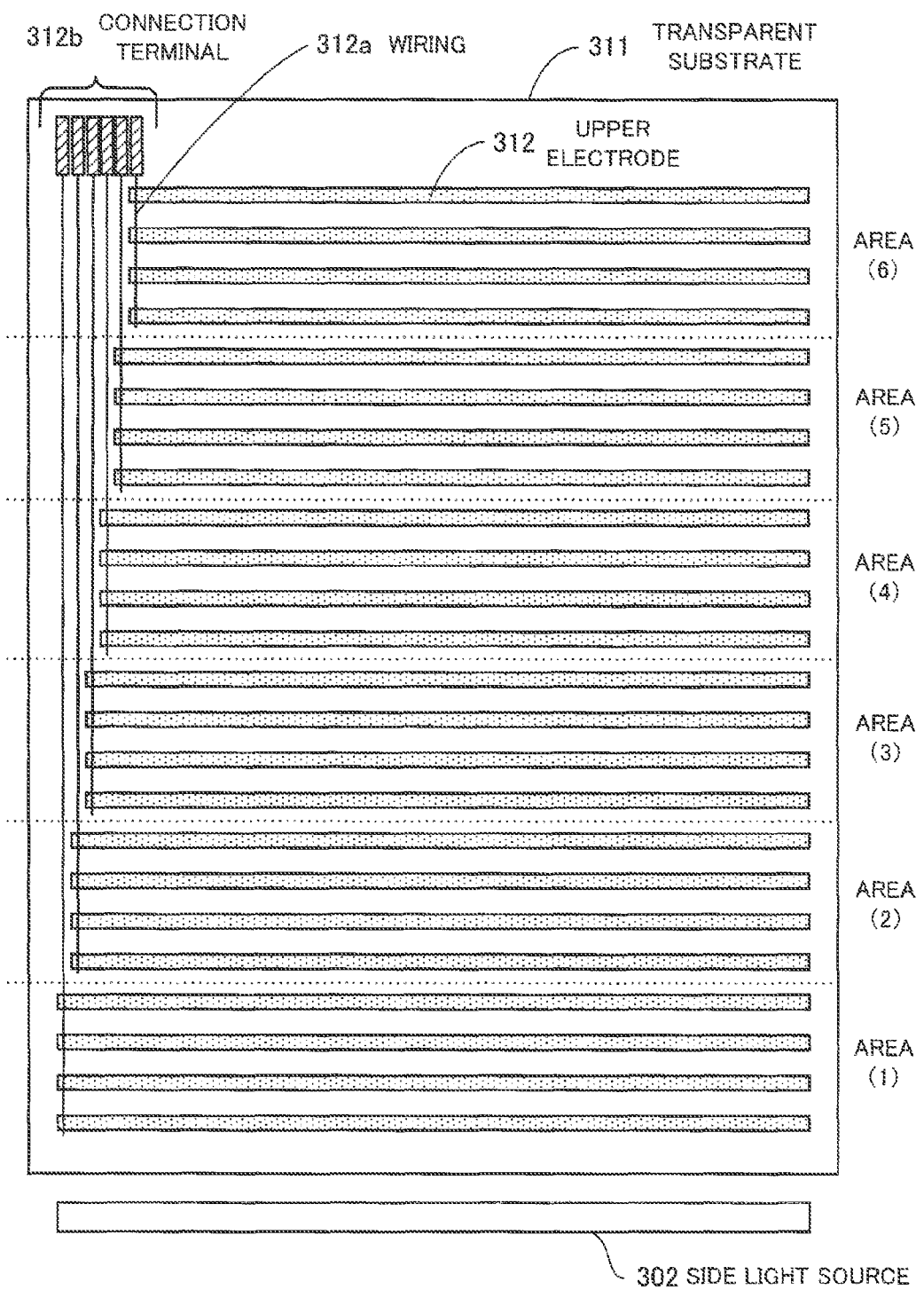
FIG. 5 is a plan view illustrating an example of a configuration of upper electrodes in a light guide member according to the second embodiment.
Figure 6:
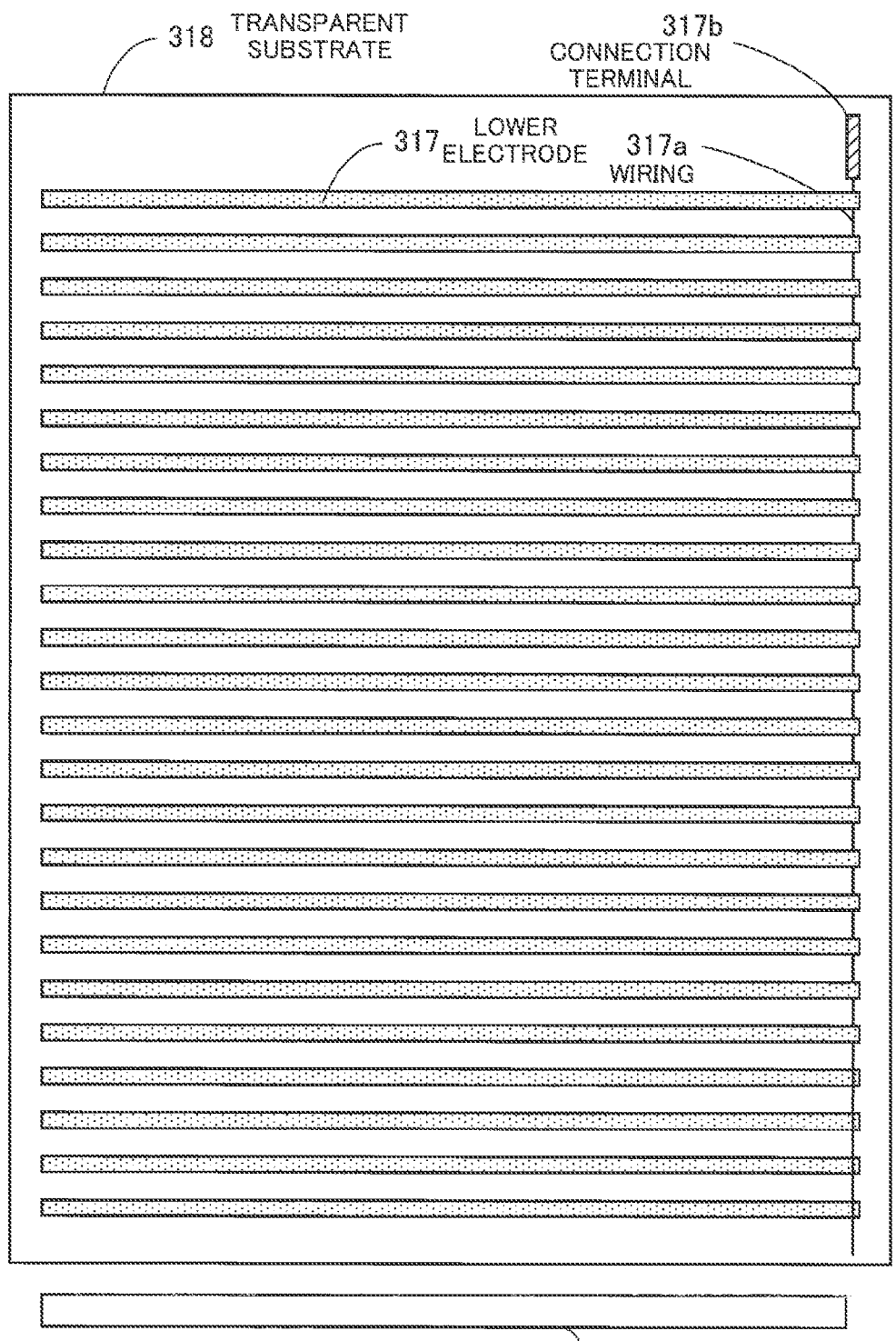
FIG. 6 is a plan view illustrating an example of a configuration of lower electrodes in the light guide member according to the second embodiment.

3 to 6. FIG. 3 is a plan view illustrating an example of a configuration of the planar light source device 300 according to the second embodiment. FIG. 4 is a sectional view illustrating an example of a configuration of the planar light source device 300 according to the second embodiment. FIG. 5 is a plan view illustrating an example of a configuration of upper electrodes in a light guide member 310 according to the second embodiment. FIG. 6 is a plan view illustrating an example of a configuration of lower electrodes in the light guide member 310 according to the second embodiment.

The planar light source device 300 is arranged on the back surface side of the image display panel 200 as seen from the display surface and emits light from the back surface side of the image display panel 200. The planar light source device 300 includes the light guide member 310 and a side light source 302 that emits light to at least one side surface of the light guide member 310 as an entrance surface E and that includes light sources 303a to 303j aligned to face this entrance surface E.

The light sources 303a to 303j of the side light source 302 are LEDs that emit incident light (for example, white light), and a current or a PWM value (duty ratio, etc.) of each of the light sources 303a to 303j can individually be controlled. As illustrated in FIG. 3, the light sources 303a to 303j are aligned side by side to face one side surface of the light guide member 310. Assuming that the direction in which the light sources 303a to 303j are aligned is defined as a light source alignment direction LY, the light sources 303a to 303j emits light in an incident direction LX that is perpendicular to the light source alignment direction LY, and the light enters the light guide member 310 via the entrance surface E. In place of the LEDs, semiconductor lasers may be used as the light sources 303a to 303j.

The light guide member 310 guides the light, which is emitted from the side light source 302 (the light sources 303a to 303j) arranged beside the light guide member 310, to the top surface of the light guide member 310. The light guide member 310 has a shape that match the image display panel 200 arranged over the top surface of the planar light source device 300. The light guide member 310 includes a plurality of divided areas arranged in the direction in which the light travels. Numbers (1) to (6) are given to these areas in order of distance from the side light source 302.

A planar light source device drive unit 500 is connected or coupled to the side light source 302 (the light sources 303a to 303j) and the light guide member 310 so that the planar light source device drive unit 500 can transmit signals to these units. The planar light source device drive unit 500 causes the planar light source device 300 to perform partial drive so that light is sequentially emitted from the light emission surfaces of the areas (1) to (6) of the light guide member 310 (from the surfaces that face the image display panel 200). The partial drive will be described in detail below with reference to FIG. 8.

Next, the planar light source device 300 will be described more specifically with reference to FIG. 4. The planar light source device 300 includes the side light source 302, the light guide member 310, and a reflection sheet 330 arranged below the bottom surface of the light guide member 310 (the surface opposite to the surface facing the image display panel 200) as seen from the display surface of the image display panel 200.

The reflection sheet 330 returns the light leaked from the back surface of the light guide member 310 (the bottom surface in FIG. 4) to the light guide member 310. For example, the reflection sheet 330 has a function of reflecting, diffusing, or scattering light. In this way, the light received from the side light source 302 is efficiently used, and the luminance of the light emitted from the light emission surfaces of the planar light source device 300 is improved. For example, foamed polyethylene terephthalate (PET), a deposited silver film, a multi-layer reflection film, or white PET may be used as the reflection sheet 330. In FIG. 4, an air layer is present between the reflection sheet 330 and the light guide member 310. The reflection sheet 330 and the light guide member 310 are not optically attached to each other.

Each of the areas in the light guide member 310 includes a transparent substrate 311, upper electrodes 312, an orientation film 313, a light modulation layer 314 and spacers 315, an orientation film 316, lower electrodes 317, and a transparent substrate 318 that are sequentially arranged.

The transparent substrates 311 and 318 support the light modulation layer 314 and are normally made by substrates such as glass plates or plastic films that are transparent with respect to visible light.

The upper electrodes 312 are transparent electrodes that are arranged on the transparent substrate 311 and that face the transparent substrate 318. Next, the upper electrodes 312 will be described with reference to FIG. 5. For example, as illustrated in FIG. 5, each of the areas (1) to (6) includes upper electrodes 312 within a plane thereof, and each of the upper electrodes 312 is formed in a band that extends in parallel to the direction in which the side light source 302 extends.

The upper electrodes 312 in each of the areas (1) to (6) are electrically connected to a corresponding wiring 312a. A voltage based on a signal from the planar light source device drive unit 500 is applied to each upper electrode 312 via a corresponding connection terminal 312b located at an end of a corresponding wiring 312a. As a result, the upper electrodes 312 are controlled per area. The description will be continued with reference to FIG. 4 again.

The lower electrodes 317 are arranged on the transparent substrate 318 and face the transparent substrate 311. The lower electrodes 317 will be described with reference to FIG. 6. As illustrated in FIG. 6, each of the lower electrodes 317 is formed in a band that extends in parallel to the direction in which the areas (1) to (6) extend. The lower electrodes 317 are arranged to face the upper electrodes 312. The lower electrodes 317 are electrically connected to a wiring 317a. A voltage based on a signal from the planar light source device drive unit 500 is applied to a connection terminal 317b located at an end of the wiring 317a. For example, an electric field is applied in the light modulation layer in one area, the electric field corresponding to the voltage difference between the upper electrodes 312 and the lower electrodes 317 in this area. This voltage will hereinafter be referred to as "inter-electrode voltage difference." The shape of each of the upper and lower electrodes 312 and 317 is not limited to the band. The upper and lower electrodes 312 and 317 may have any shape, as long as an electric field can be applied per light modulation layer. The description will be continued with reference to FIG. 4 again.

The orientation films 313 and 316 are used for orientation of liquid crystal molecules 314b in the light modulation layers 314, for example. The orientation films may be vertical orientation films or horizontal orientation films.

The spacers 315 are for controlling the gap between the transparent substrates 311 and 318. The spacers 315 are made by transparent material that transmits light. The spacers 315 are formed so as not to overlap any of the upper and lower electrodes 312 and 317. The spacers 315 transmit more light than the light modulation layers 314 in the transmission state do. Thus, instead of arranging a single light modulation layer 314 throughout each area, by arranging the spacers 315, the attenuation of the light travelling in the light guide member 310 is further prevented. However, the light guide member 310 may be formed without the spacers 315.

Each of the light modulation layers 314 is a polymer-dispersed liquid crystal layer and is formed by a composite layer including a liquid crystal monomer 314a and a plurality of liquid crystal molecules 314b dispersed therein. The liquid crystal monomer 314a and the liquid crystal molecules 314b have the same optical anisotropy.

Figure 7:
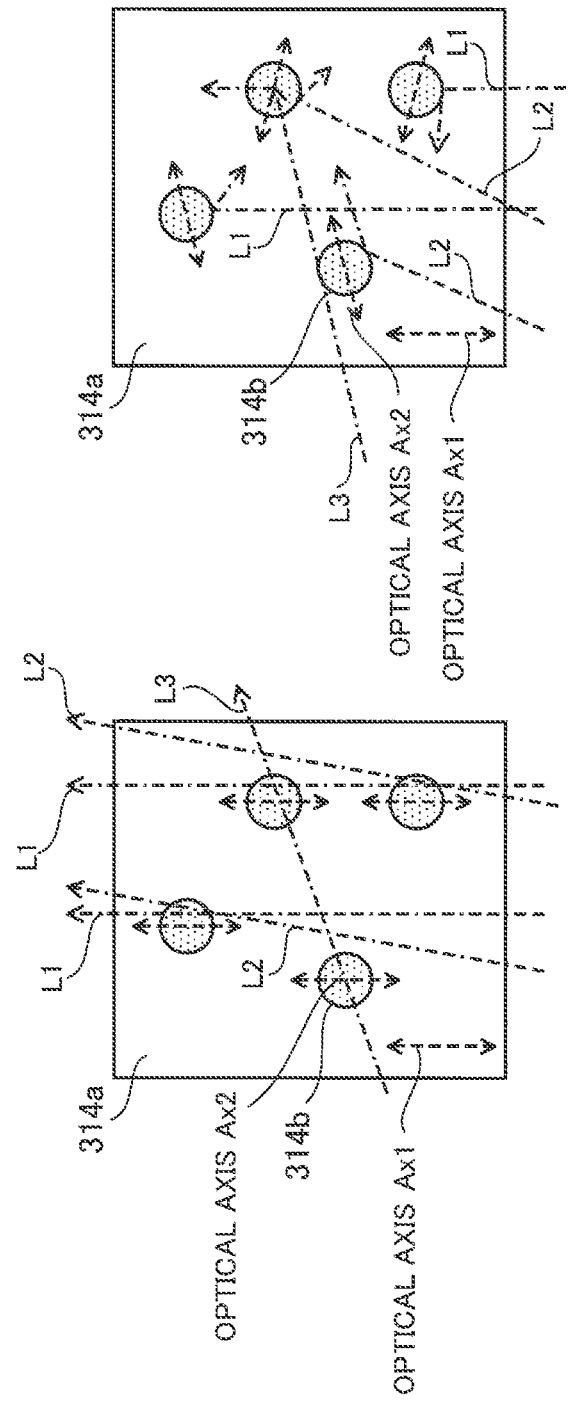
FIGS. 7A and 7B schematically illustrate the acting of a light modulation layer according to the second embodiment.

The acting of these light modulation layers 314 will be described with reference to FIGS. 7A and 7B. FIGS. 7A and 7B schematically illustrate the acting of a light modulation layer according to the second embodiment. In FIGS. 7A and 7B, optical axes Ax1 and Ax2 are lines which are parallel to the traveling direction of a light beam that has a single refractive index irrespective of the polarization direction and are schematically illustrated in the liquid crystal monomers 314a and liquid crystal molecules 314b, respectively, in FIGS. 7A and 7B.

First, a case in which no inter-electrode voltage difference is generated in an area will be described with reference to FIG. 7A. Namely, no electric field is applied in the light modulation layer 314 in this area.

In this case, the direction of the optical axis Ax1 of the liquid crystal monomer 314a matches (or is parallel to) that of the optical axes Ax2 of the liquid crystal molecules 314b, as illustrated in FIG. 7A. The direction of the optical axis Ax1 does not always need to perfectly match the direction of the optical axes Ax2. The direction of the optical axis Ax1 and the direction of the optical axes Ax2 may be somewhat misaligned by a manufacturing error, for example.

When no electric field is applied in a light modulation layer 314, the optical axes Ax2 of the liquid crystal molecules 314b are perpendicular to surfaces of the transparent substrates 311 and 318. In contrast, as illustrated in FIGS. 7A and 7B, the optical axis Ax1 of the liquid crystal monomer 314a is perpendicular to the surfaces of the transparent substrates 311 and 318, irrespective of the presence of an electric field in the light modulation layer 314. The optical axes Ax2 do not always need to be perfectly perpendicular to the surfaces of the transparent substrates 311 and 318. For example, the optical axes Ax2 may cross the surfaces of the transparent substrates 311 and 318 at an angle other than 90 degrees because of a manufacturing error. In addition, the optical axis Ax1 does not always need to be perfectly perpendicular to the surfaces of the transparent substrates 311 and 318. For example, the optical axis Ax1 may cross the surfaces of the transparent substrates 311 and 318 at an angle other than 90 degrees because of a manufacturing error.

It is preferable that the liquid crystal monomer 314a and the liquid crystal molecules 314b have the same ordinary light refractive index and the same extraordinary light refractive index. In this case, for example, when no inter-electrode voltage difference is generated in an area and no electric field is applied in the corresponding light modulation layer 314, as illustrated in FIG. 7A, there is almost no difference between the refractive indices in any direction. Thus, the transparency level is high. Accordingly, for example, light L1 traveling in the front direction (the top portion in FIG. 7A) and light L2 and light L3 traveling in the oblique direction (obliquely upward in FIG. 7A) are transmitted through the light modulation layer 314, without being scattered in the light modulation layer 314.

Next, a case in which an inter-electrode voltage difference is generated in an area will be described with reference to FIG. 7B. Namely, an electric field is applied in the light modulation layer 314 in this area.

In this case, since an electric field is applied in the corresponding light modulation layer 314 by the inter-electrode voltage difference, the optical axes Ax2 of the liquid crystal molecules 314b are slanted. Thus, the direction of the optical axes Ax2 of the liquid crystal molecules 314b is caused to be different from (crosses) the direction of the optical axis Ax1 of the liquid crystal monomer 314a, as illustrated in FIG. 7B. In addition, for example, while the electric field is present in the light modulation layer 314 by the inter-electrode voltage difference, each of the optical axes Ax2 of the liquid crystal molecules 314b are caused to cross or be in parallel to the surfaces of the transparent substrates 311 and 318 at an angle other than 90 degrees. Thus, while the electric field is present in the light modulation layer 314 by the inter-electrode voltage difference, the difference between the refractive indices is increased in any direction. As a result, the scattering level is high. Accordingly, for example, as illustrated in FIG. 7B, the light L1 traveling in the front direction and the light L2 and light L3 traveling in the oblique direction are scattered in the light modulation layer 314.

The liquid crystal monomer 314a and the liquid crystal molecules 314b may have somewhat different ordinary light refractive indices because of a manufacturing error, for example. For example, the ordinary light refractive index is preferably 0.1 or lower and more preferably 0.05 or lower. The liquid crystal monomer 314a and the liquid crystal molecules 314b may have somewhat different extraordinary light refractive indices because of a manufacturing error, for example. For example, the extraordinary light refractive index is preferably 0.1 or lower and more preferably 0.05 or lower.

In addition, preferably, the difference between the refractive indices of the liquid crystal monomer 314a ($\Delta n_0$=an extraordinary light refractive index $n_0$–an ordinary light refractive index $n_1$) and the difference between the refractive indices of the liquid crystal molecules 314b ($\Delta n_1$=an extraordinary light refractive index $n_2$–an ordinary light refractive index $n_3$) are as large as possible, preferably 0.05 or more, more preferably 0.1 or more, and even more preferably 0.15 or more. If the liquid crystal monomer 314a and the liquid crystal molecules 314b have a large difference between the refractive indices, the scattering level of the light modulation layer 314 is increased. As a result, the light guide condition of the light guide member 310 easily fails, and the light from the light guide member 310 is easily emitted.

For example, the liquid crystal monomer 314a included in each light modulation layer 314 has a streaky structure or a porous structure that does not respond to an electric field or a rod-like structure having a lower response speed than that of the liquid crystal molecules 314b. For example, the liquid crystal monomer 314a is formed by polymerizing material (for example, monomer) having orientation and polymerization properties, the material having been oriented based on the orientation direction of the liquid crystal molecules 314b or the orientation direction of the orientation films 313 and 316, by using at least one of heat and light. In contrast, for example, the liquid crystal molecules 314b are formed mainly by liquid crystal material and have a sufficiently fast response speed than that of the liquid crystal monomer 314a.

As the monomer having orientation and polymerization properties, any material that has an optically anisotropic property and that is allowed to be compound with liquid crystal may be used. In particular, it is preferable that the monomer be a low molecular monomer that is hardened by ultraviolet light. It is preferable that the optically anisotropic direction between the liquid crystal and the material (polymer material) obtained by polymerizing the liquid crystal and the low molecular monomer matches in the state in which no electric field is applied. Thus, it is preferable that the liquid crystal and the low molecular monomer be oriented in the same direction before the low molecular monomer is hardened by ultraviolet light. If liquid crystal is used for the liquid crystal molecules 314$b$ and if the liquid crystal is rod-like molecules, it is preferable that the monomer material used also have a rod-like shape. Thus, it is preferable that material having both polymerization and liquid crystallinity properties be used as the monomer material. For example, it is preferable that the material include, as a polymerizable functional group, at least one functional group selected from the group consisting of an acryloyloxy group, a methacryloyloxy group, a vinyl ether group, and an epoxy group. These functional groups can be polymerized by irradiation of ultraviolet light, infrared light, or an electron beam or application of heat. To prevent decrease of the orientation degree during irradiation of ultraviolet light, a polyfunctionalized liquid crystal material may be added. In addition, if the orientation films 313 and 316 are not used, a state in which these materials are oriented by an external field such as a magnetic field or an electric field may be temporarily created, and the monomer may be hardened by ultraviolet light, heat, or the like. The orientation state may be created in this way.

While an example in which the transparent state is switched to the scattering state by an electric field (hereinafter, "normally transparent") has been described, the scattering state may be switched to the transparent state by an electric field (hereinafter "normally scattering"). In addition, the light guide member 310 at least includes planar internal portions, each of which entirely or partially receives the light emitted from the side light source 302. While transmission and scattering have been described, the light guide member 310 may use optical phenomena such as diffraction and refraction. However, if the light guide member 310 is used in a display-purpose illumination apparatus, in order to guide received light to a distant place and cause the light guide member 310 to emit light efficiently, a normally-transparent light guide member is preferable. The following description will be made assuming that a normally-transparent light guide member is used.

Figure 8:
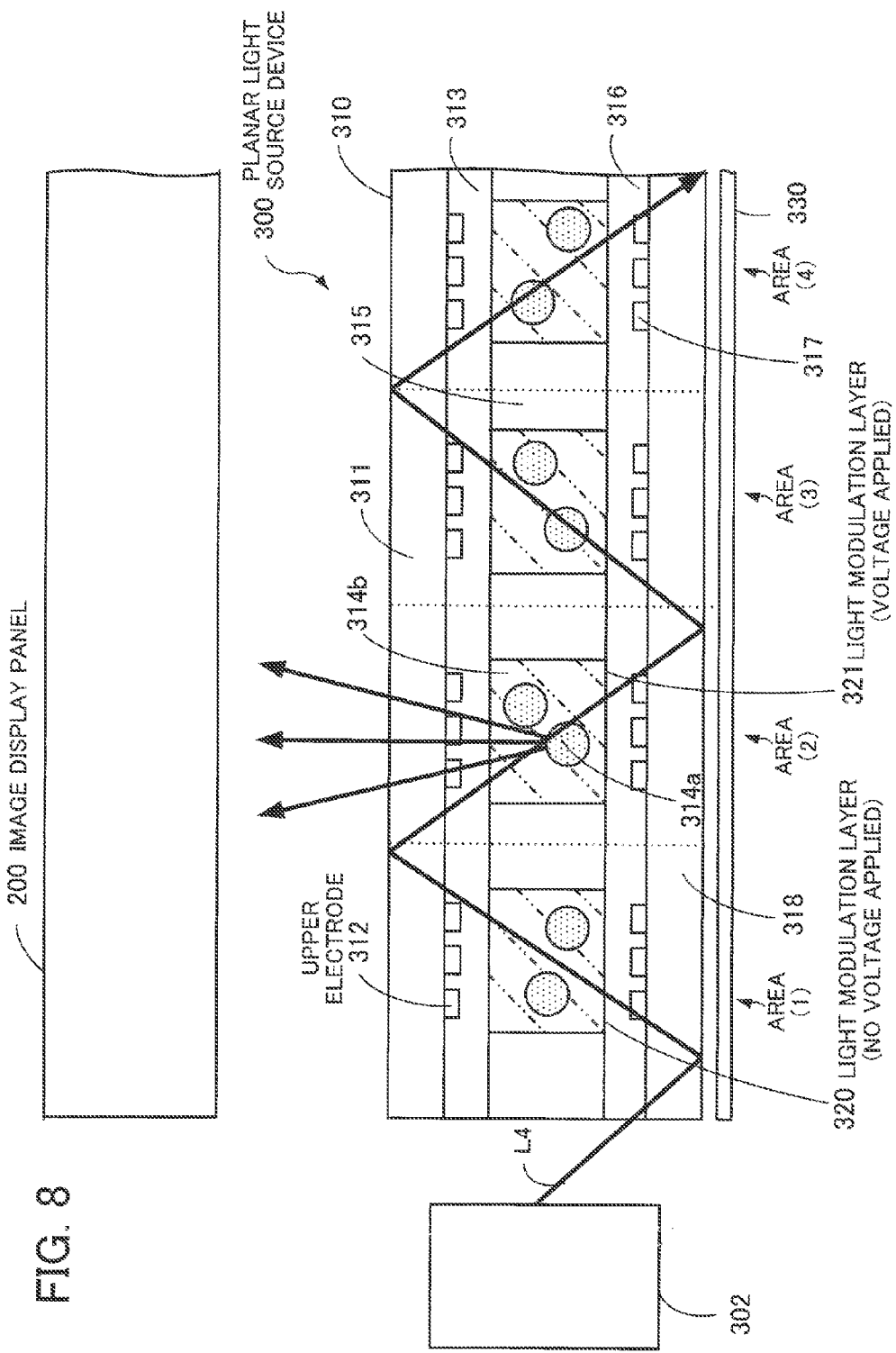
FIG. 8 illustrates an example of partial drive of the planar light source device according to the second embodiment.

Next, partial drive will be described. FIG. 8 illustrates an example of partial drive of the planar light source device 300 according to the second embodiment. The planar light source device drive unit 500 controls the planar light source device 300 to emit light from the area (2) of the light guide member 310.

The light modulation layer 320 of the area (1) of the light guide member 310 is in a state in which no voltage difference is generated between the corresponding upper and lower electrodes (no voltage applied). Namely, this light modulation layer 320 is in the transmission state illustrated in FIG. 7A.

The light modulation layer 321 of the area (2) of the light guide member 310 is in a state in which a voltage difference is generated between the corresponding upper and lower electrodes (voltage applied). Namely, this light modulation layer 321 is in the scattering state illustrated in FIG. 7B.

Light L4 emitted from the side light source 302 enters the side surface of the light guide member 310 and travels in the horizontal direction in FIG. 8 as it is totally reflected between the transparent substrates 311 and 318.

Since no voltage is applied to the light modulation layer 320, the direction of the optical axis of the liquid crystal monomer 314$a$ matches that of the optical axes of the liquid crystal molecules 314$b$. Namely, there is almost no difference between the refractive indices. Thus, the light L4 that has entered the area (1) including the light modulation layer 320 is transmitted without being scattered and travels in the horizontal direction (toward the area (2)). Namely, the light is not emitted from the light emission surface of the area (1) including the light modulation layer 320 to which no voltage is applied.

However, since a voltage is applied to the light modulation layer 321, the direction of the optical axis of the liquid crystal monomer 314$a$ does not match that of the optical axes of the liquid crystal molecules 314$b$. Namely, the difference between the refractive indices is increased in any direction. Thus, the light L4 that has entered the area (2) including the light modulation layer 321 is scattered in the light modulation layer 321. Of all the scattered light L4, part of the light L4 that travels in the direction of the image display panel 200 is emitted from the light guide member 310. As a result, the light is emitted to the image display panel 200 from the area (2) including the light modulation layer 321 to which the voltage is applied. In addition, of all the scattered light L4, part of the light L4 that travels in the direction of the reflection sheet 330 is emitted from the light guide member 310, reflected by the reflection sheet 330, and returns to the inside of the light guide member 310. Subsequently, the light is emitted from the relevant light emission surface of the light guide member 310. Thus, by using the reflection sheet 330 in the planar light source device 300, the luminance of the light emitted from any of the light emission surfaces of the light guide member 310 is increased.

As described above, the planar light source device drive unit 500 generates a voltage difference between upper and lower electrodes of an individual area, to apply an electric field in the corresponding light modulation layer. In this way, light is scattered in the light modulation layer of any one of the areas. As a result, light is emitted from any one of the light emission surfaces of the areas of the light guide member 310.

Figure 9:
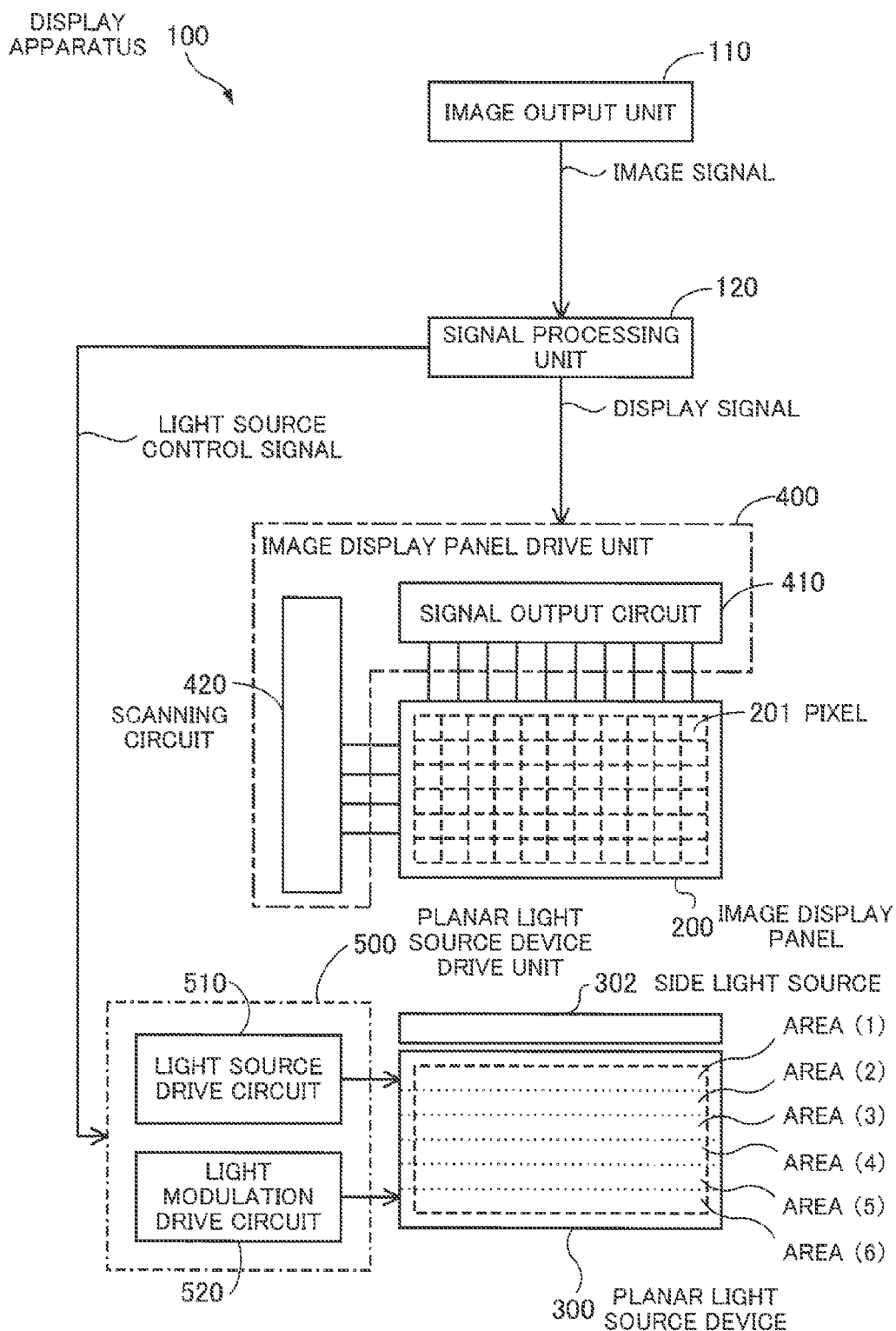
FIG. 9 illustrates an example of a configuration of functions of the display apparatus according to the second embodiment.

Next, an example of a configuration of functions of the display apparatus 100 configured as described above will be described with reference to FIG. 9. FIG. 9 illustrates an example of a configuration of functions of the display apparatus 100 according to the second embodiment.

The display apparatus 100 includes an image output unit 110, a signal processing unit 120, the image display panel 200, the planar light source device 300, an image display panel drive unit 400, and the planar light source device drive unit 500.

The image output unit 110 outputs an image signal to the signal processing unit 120. In the image signal, color information about an individual pixel 201 of the image display panel 200 is set (information about an image displayed on a display unit).

The signal processing unit 120 is connected to the image display panel drive unit 400 that drives the image display panel 200 and to the planar light source device drive unit 500 that drives the planar light source device 300. On the basis of the image signal, the signal processing unit 120 generates a display signal for displaying an image on the image display panel 200 and outputs the display signal to the image display panel drive unit 400. In addition, on the basis of the image signal, the signal processing unit 120 generates a light source control signal for driving the planar light source device 300 and outputs the light source control signal to the planar light source device drive unit 500.

The image display panel 200 includes a display surface that is divided into areas, each of which is used as a display unit for displaying an image. This display unit will be referred to as a pixel 201. For example, P×Q pixels 201 are arranged in a matrix to form the display surface.

An individual pixel 201 includes three subpixels of red (R), green (G), and blue (B). These colors red (R), green (G), and blue (B) are examples. For example, an individual pixel 201 may include four subpixels of red (R), green (G), blue (B), and white (W). Alternatively, other colors such as cyan, magenta, and yellow may be used.

The image display panel drive unit 400 includes a signal output circuit 410 and a scanning circuit 420 and drives the image display panel 200. By causing the scanning circuit 420 to sequentially output a scanning signal based on the display signal, the image display panel drive unit 400 selects pixels 201. In addition, by causing the signal output circuit 410 to sequentially output a video signal based on the display signal, the image display panel drive unit 400 controls operations (light transmission) of the pixels 201.

The planar light source device 300 is arranged on the back surface side of the image display panel 200 as seen from the display surface and emits light to the image display panel 200. The planar light source device 300 is arranged so that the scanning direction of the scanning circuit of the image display panel 200 (from the top to the bottom in FIG. 9) is in parallel to the direction in which the light from the side light source 302 travels. Namely, the planar light source device 300 is arranged with respect to the image display panel 200 so that the video scanning by the video signals is sequentially performed from a portion (pixels 201) of the image display panel 200, the portion corresponding to the area (1) of the light guide member 310, to a portion (pixels 201) of the image display panel 200, the portion corresponding to the area (6) of the light guide member 310.

The planar light source device drive unit 500 includes a light source driving circuit 510 and a light modulation drive circuit 520. On the basis of the light source control signal output from the signal processing unit 120, the light source driving circuit 510 controls the output level of the light emitted from the side light source 302 of the planar light source device 300. On the basis of the light source control signal output from the signal processing unit 120, the light modulation drive circuit 520 controls a voltage between upper electrodes 312 and lower electrodes 317 and controls an electric field applied in the light modulation layer 314 of an individual area (the intensity of the electric field or the duration of the period in which the electric field is applied). In this way, the planar light source device drive unit 500 controls the luminance of the light emitted from an individual light emission surface of the planar light source device 300 (the light guide member 310).

The processing operations of the signal processing unit 120 are realized by the display driver IC 100*b* and the LED driver IC 100*c* or the CPU 100*a*1 illustrated in FIG. 2. If the processing operations are realized by the display driver IC 100*b*, an input signal is input to the display driver IC 100*b* and the LED driver IC 100*c* via the CPU 100*a*1. The display driver IC 100*b* generates the display signal and controls the image display panel 200. In addition, the display driver IC 100*b* generates the light source control signal and outputs the generated light source control signal to the LED driver IC 100*c* via the bus 100*f*.

If the processing operations are realized by the CPU 100*a*1, the CPU 100*a*1 inputs the display signal to the display driver IC 100*b*. In addition, the CPU 100*a*1 also generates the light source control signal and outputs the generated light source control signal to the LED driver IC 100*c* via the bus 100*f*.

Figure 10:
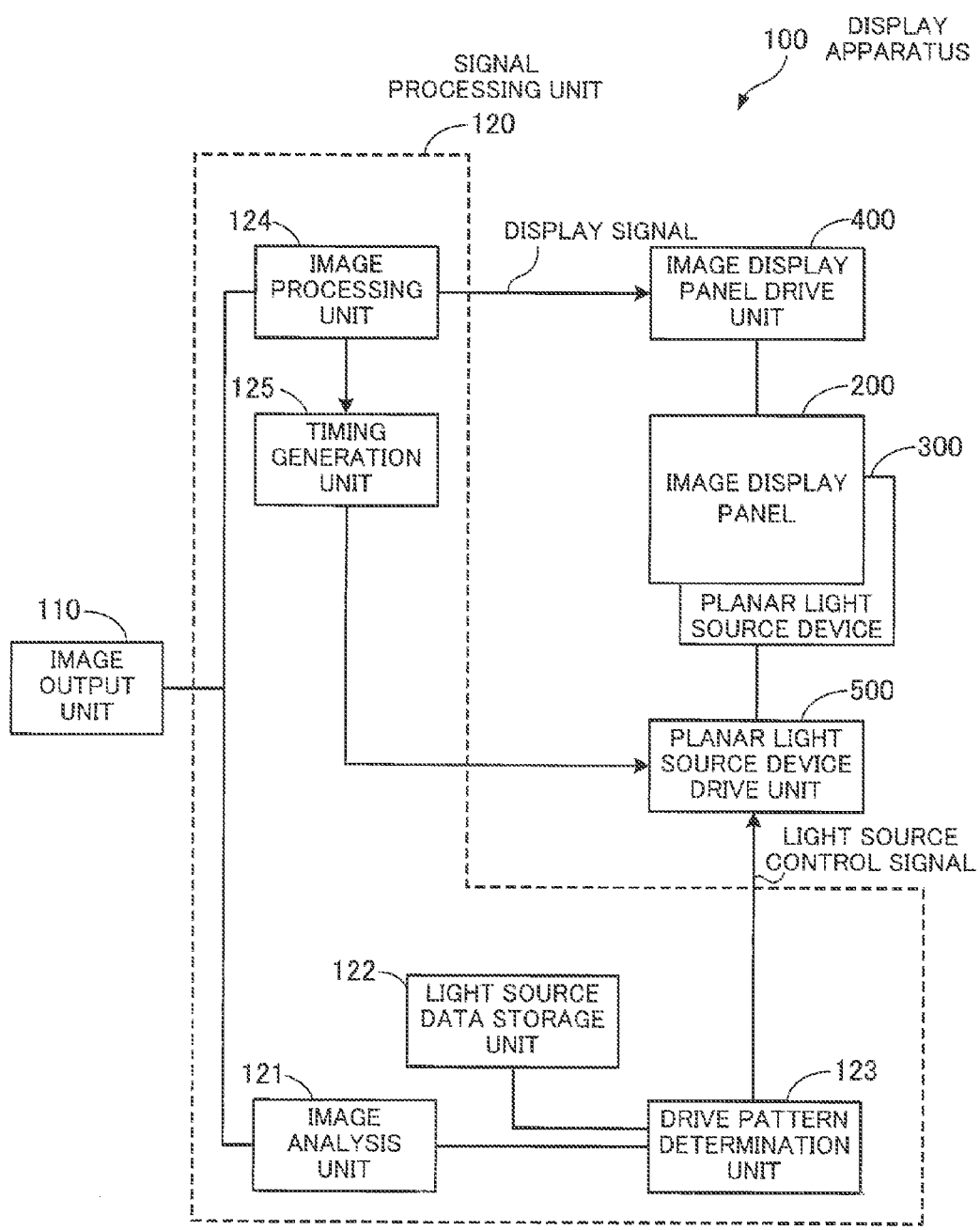
FIG. 10 illustrates an example of a configuration of functions of a signal processing unit included in the display apparatus according to the second embodiment.

Next, an example of a configuration of functions of the signal processing unit 120 included in the display apparatus 100 will be described with reference to FIG. 10. FIG. 10 illustrates an example of a configuration of functions of the signal processing unit 120 included in the display apparatus 100 according to the second embodiment.

The signal processing unit 120 includes an image analysis unit 121, a light source data storage unit 122, a drive pattern determination unit 123, an image processing unit 124, and a timing generation unit 125. The signal processing unit 120 receives an image signal from the image output unit 110.

The image analysis unit 121 analyzes the image signal and calculates a requested luminance value of the light emitted from an individual area of the light guide member 310 of the planar light source device 300 on the basis of an image displayed on the image display panel 200 (hereinafter, a requested luminance value per area, as needed). The requested luminance values are the luminance values requested for the light emitted from the respective areas, and the planar light source device 300 is controlled so that these requested luminance values are satisfied.

The image analysis unit 121 analyzes the image signal in the previous single-image display frame and calculates a requested luminance value per area in the current single-image display frame from the image in the previous single-image display frame. For example, by analyzing the image signal in the previous single-image display frame, the image analysis unit 121 calculates an individual requested luminance value corresponding to all the light emission surfaces. An individual requested luminance value corresponding to all the light emission surfaces may be a preset fixed value. By analyzing an image signal per area in the previous single-image display frame (a signal necessary for determining an image displayed on a portion corresponding to an individual area of the image display panel 200), the image analysis unit 121 may calculate a requested luminance value per area.

Alternatively, each time an image signal per area in a single-image display frame is input, the image analysis unit 121 may analyze the input image signal per area and calculate a requested luminance value per area.

Alternatively, each area may be divided into two-dimensional (2D) array blocks in a direction in parallel to the direction in which the light travels, and the image analysis unit 121 may calculate a requested luminance value per block or per pixel 201.

The light source data storage unit 122 holds luminance distribution information corresponding to a case in which all the light sources 303*a* to 303*j* are operated in a predetermined lighting pattern and the upper and lower electrodes 312 and 317 of the areas are controlled in a predetermined voltage application pattern (a case in which a predetermined electric field is applied in a predetermined period).

The luminance distribution information indicates the luminance values of the light emitted from the areas to the image display panel 200 when all the light sources 303*a* to 303*j* are lit with a predetermined lighting amount and when an electric field having a predetermined intensity is applied in the light modulation layer of each area in a time-sharing manner in a predetermined period. The light source data storage unit 122 holds the luminance distribution information (light source lookup table) in which the luminance values are set in the form of a table.

ince the light source lookup table includes information unique to the display apparatus 100, the display apparatus 100 previously creates and stores the light source lookup table in the light source data storage unit 122. Regarding the luminance distribution information, the display surface of the image display panel 200 (or the entire light emission surface of the planar light source device 300) may be divided into m×n areas (m and n are integers that satisfy 1≤m≤P and 1≤n≤Q, respectively), a luminance value of the planar light source device 300 detected per divided area may be stored.

On the basis of a requested luminance value per area and the light source lookup table, the drive pattern determination unit 123 determines the lighting pattern of the side light source 302 and the voltage application pattern with respect to the upper electrodes 312 and the lower electrodes 317 (the drive pattern of the planar light source device 300).

The drive pattern determination unit 123 corrects the difference between the requested luminance values of the areas and the luminance values of the areas set in the light source lookup table by changing the light emission output level of the side light source 302 and determines the lighting pattern and the voltage application pattern.

The drive pattern determination unit 123 corrects the difference between the requested luminance values of the areas and the luminance values of the areas set in the light source lookup table by changing the duration of the period in which an individual light modulation layer is controlled in the scattering state (in which an electric field is applied) and determines the lighting pattern and the voltage application pattern.

The drive pattern determination unit 123 corrects the difference between the requested luminance values of the areas and the luminance values of the areas set in the light source lookup table by changing the scattering degree of the scattering state of an individual light modulation layer (by changing the intensity of the electric field applied) and determines the lighting pattern and the voltage application pattern.

Exemplary drive patterns including the lighting pattern of the light sources 303a to 303j and the voltage application pattern with respect to the upper electrodes 312 and the lower electrodes 317 of the light guide member 310 will be described below.

On the basis of the image signal, the image processing unit 124 generates a display signal.

The timing generation unit 125 generates a timing signal for controlling a timing at which the planar light source device drive unit 500 brings the light modulation layer of an individual area of the planar light source device 300 in the scattering state (hereinafter, emission scanning). The timing generation unit 125 generates a timing signal based on a timing at which the image processing unit 124 outputs a display signal.

Next, drive patterns corresponding to a case in which the image analysis unit 121 calculates the requested luminance values corresponding to all the light emission surfaces by analyzing an image signal in the previous single-image display frame will be described with reference to FIGS. 11 to 13.

Figure 11:
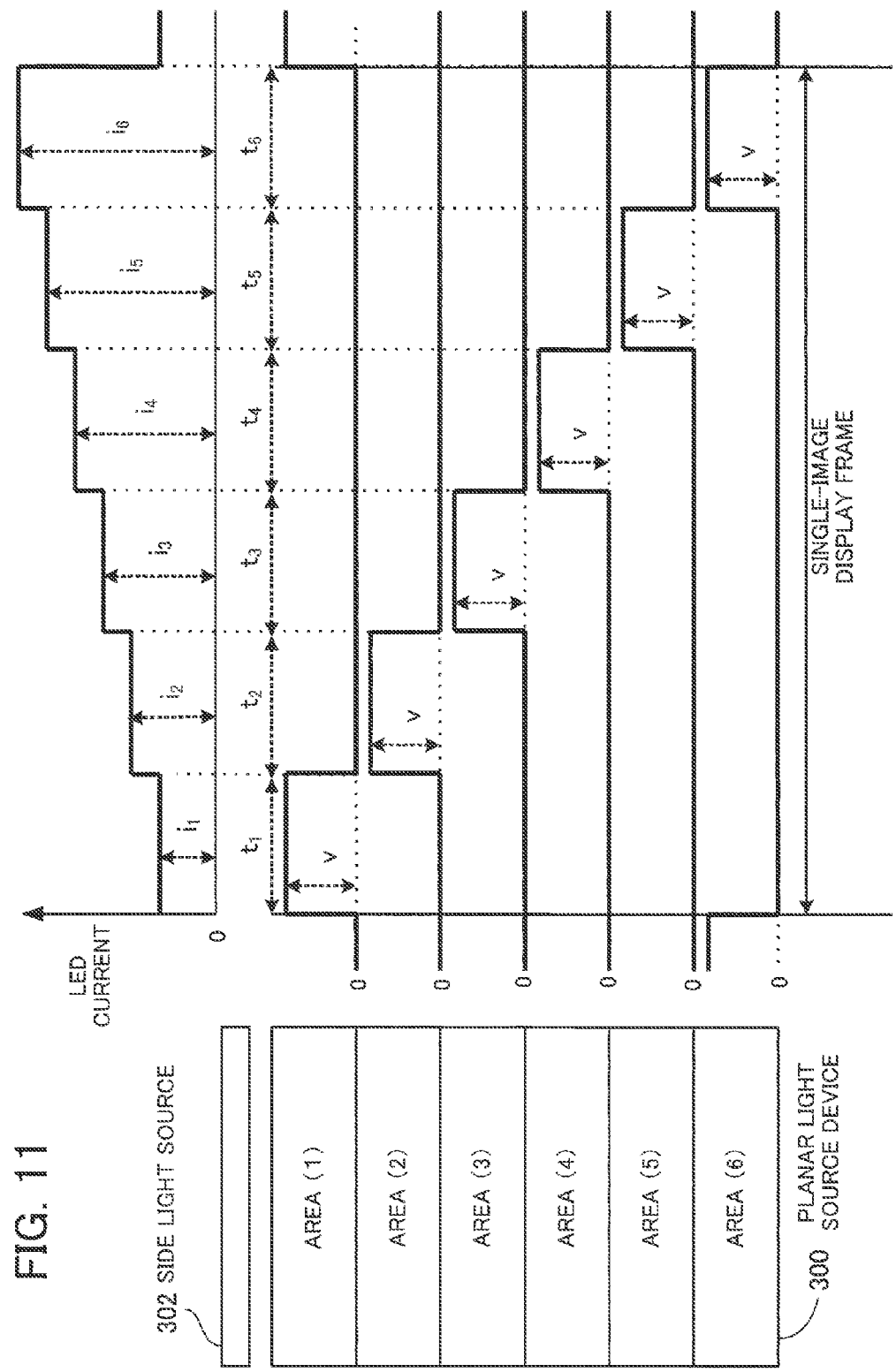
FIG. 11 illustrates a drive pattern according to the second embodiment in which the light emission output level of a side light source is changed.

FIG. 11 illustrates a drive pattern according to the second embodiment in which the light emission output level of the side light source 302 is changed. FIG. 12 illustrates a drive pattern according to the second embodiment in which the intensity of the electric field is changed. FIG. 13 illustrates a drive pattern according to the second embodiment in which the duration of the electric field application period is changed.

As illustrated in FIG. 11, a single-image display frame is divided into scattering control periods $t_1$ to $t_6$ that are given to the light modulation layers of the areas (1) to (6), respectively. In each scattering control period, a corresponding area emits light. The planar light source device 300 brings the light modulation layers of the areas in the scattering state in the scattering control periods $t_1$ to $t_6$, respectively. For example, the scattering control periods $t_1$ to $t_6$ are set by dividing a single-image display frame by the number of areas. In the scattering control period $t_1$, light is emitted from the area (1). Likewise, in the scattering control periods $t_2$ to $t_6$, light is emitted from the areas (2) to (6), respectively. "LED current" in FIG. 11 indicates the value of the current supplied to the light sources 303a to 303j of the side light source 302. If the value of the LED current is increased, the light emission output level of the side light source 302 is also increased. The same current is supplied to the light sources 303a to 303j.

Normally, when light is simply emitted from the side light source 302 to the side surface of the light guide member 310, the luminance of the light that has entered the light guide member 310 attenuates as it travels through the light guide member 310 (as it travels away from the side surface). Thus, if the display apparatus 100 controls all the areas in the same control mode, each of the light emission surfaces of the planar light source device 300 does not emit light having a uniform luminance. Namely, to cause each area to emit light having a desired luminance, it is desirable that the display apparatus 100 control the planar light source device drive unit 500 by taking into consideration the light attenuation that occurs depending on the distance between the side surface and an individual area.

The drive pattern determination unit 123 determines a drive pattern that compensates for the light attenuation that occurs depending on the distance by correcting the difference between the target requested luminance value and the light source lookup table with the light emission output level of the side light source 302 (the magnitude of the LED current).

Namely, the drive pattern determination unit 123 maintains, throughout the areas, the duration of the electric field application period and the intensity of the electric field and changes only the value of the LED current (the light emission output level of the side light source 302).

With this drive pattern determined by the drive pattern determination unit 123, for example, an electric field corresponding to an inter-electrode voltage difference v is generated in the light modulation layer of the area (1) in the scattering control period $t_1$, and the side light source 302 emits light having an output level corresponding to the LED current $i_1$.

Likewise, the electric field corresponding to the inter-electrode voltage difference v is generated in the light modulation layer of the area (2) in the scattering control period $t_2$. However, the side light source 302 emits light having an output level corresponding to the LED current $i_2$ ($>i_1$). Likewise, the electric field corresponding to the inter-electrode voltage difference v is generated in the light modulation layers of the areas (3) to (6) in the scattering control periods $t_3$ to $t_6$, respectively. However, the side light source 302 emits light having output levels corresponding to the LED currents $i_3$ to $i_6$ ($i_2<i_3<i_4<i_5<i_6$), respectively.

In this way, by controlling the magnitude of the LED current on the basis of the distance between an individual area and the side light source 302, the light attenuation in the planar light source device 300 that occurs depending on the distance is corrected by the light emission output level of the side light source 302. As a result, the planar light source device 300 prevents the intensity of the light emitted from an individual area from changing from the corresponding requested intensity because of the light attenuation that occurs depending on the distance. In addition, an individual area of the planar light source device 300 emits light having a desired luminance to the image display panel 200.

Figure 12:
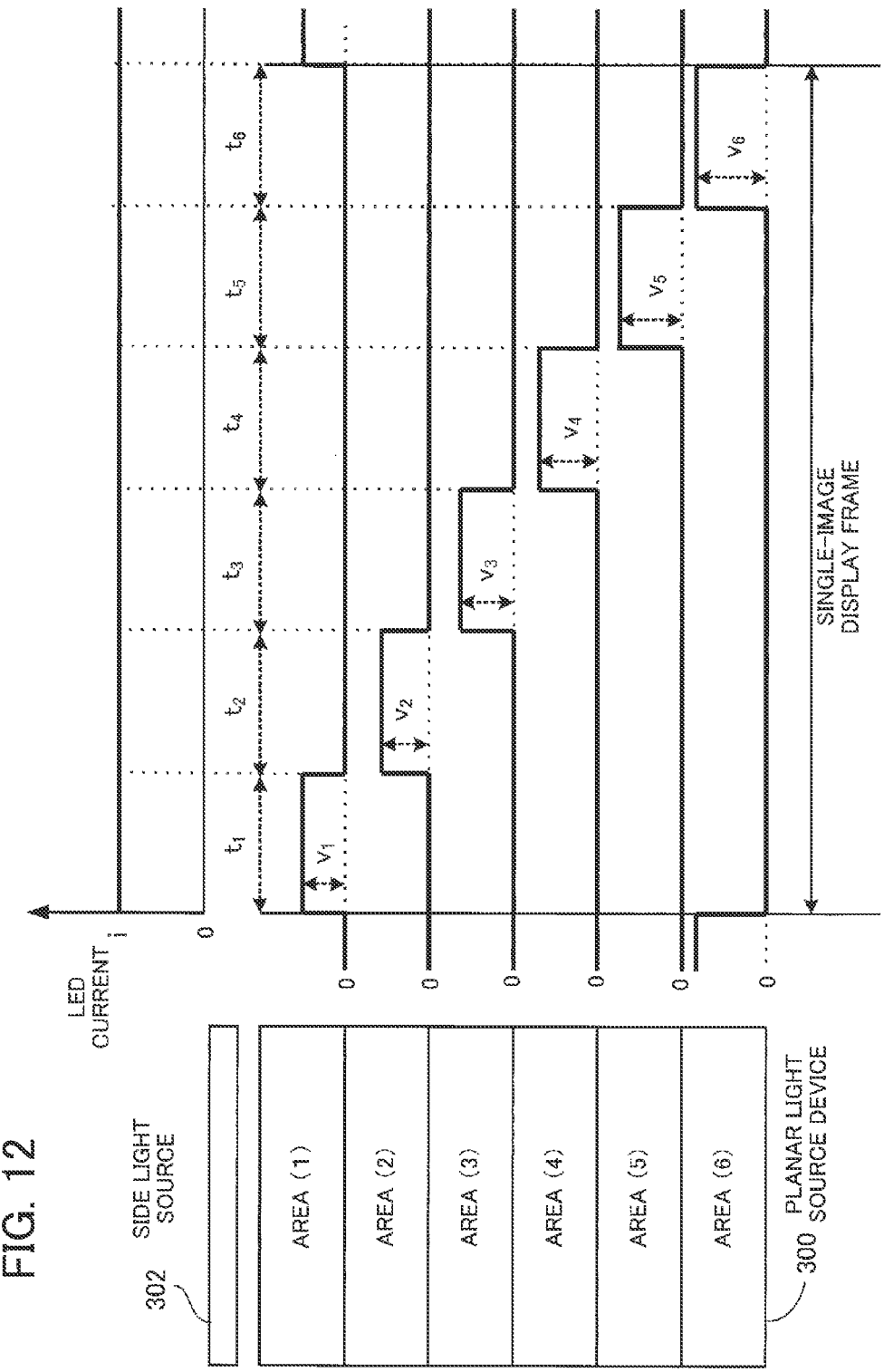
FIG. 12 illustrates a drive pattern according to the second embodiment in which the intensity of the electric field is changed.

Alternatively, as illustrated in FIG. 12, the drive pattern determination unit 123 may determine a drive pattern that compensates for the light attenuation that occurs depending on the distance by correcting the difference between the target requested luminance value and the light source lookup table with the scattering degree (the intensity of the electric field) of the scattering state of the target light modulation layer.

Namely, the drive pattern determination unit 123 maintains, throughout the areas, the duration of the electric field application period and the light emission output level of the side light source 302 while the target light modulation layer is in the scattering state. However, the drive pattern determination unit 123 changes only the inter-electrode voltage difference (the intensity of the electric field).

With this drive pattern determined by the drive pattern determination unit 123, for example, an electric field corresponding to an inter-electrode voltage difference $v_1$ is generated in the light modulation layer 314 of the area (1) in the scattering control period $t_1$, and the side light source 302 emits light having an output level corresponding to the LED current i. In addition, an electric field corresponding to an inter-electrode voltage difference $v_2$ ($>v_1$) is generated in the light modulation layer 314 of the area (2) in the scattering control period $t_2$, and the side light source 302 emits the light having the output level corresponding to the LED current i. Likewise, electric fields corresponding to inter-electrode voltage differences $v_3$ to $v_6$ ($v_2<v_3<v_4<v_5<v_6$) are generated in the light modulation layers of the areas (3) to (6) in the scattering control periods $t_3$ to $t_6$, respectively, and the side light source 302 emits the light having the output level corresponding to the LED current i. Since a larger inter-electrode voltage difference generates a greater electric field, the scattering degree of the scattering state of the light modulation layer of the target area is increased. As a result, more light is emitted from the target area.

In this way, the magnitude of the inter-electrode voltage difference of the target area is controlled on the basis of the distance between the target area and the side light source 302. Namely, the light attenuation in the planar light source device 300 that occurs depending on the distance is corrected by the scattering degree in the target light modulation layer. As a result, the planar light source device 300 prevents the intensity of the light emitted from an individual area from changing from the corresponding requested intensity because of the light attenuation that occurs depending on the distance. In addition, an individual area of the planar light source device 300 emits light having a desired luminance to the image display panel 200.

Figure 13:
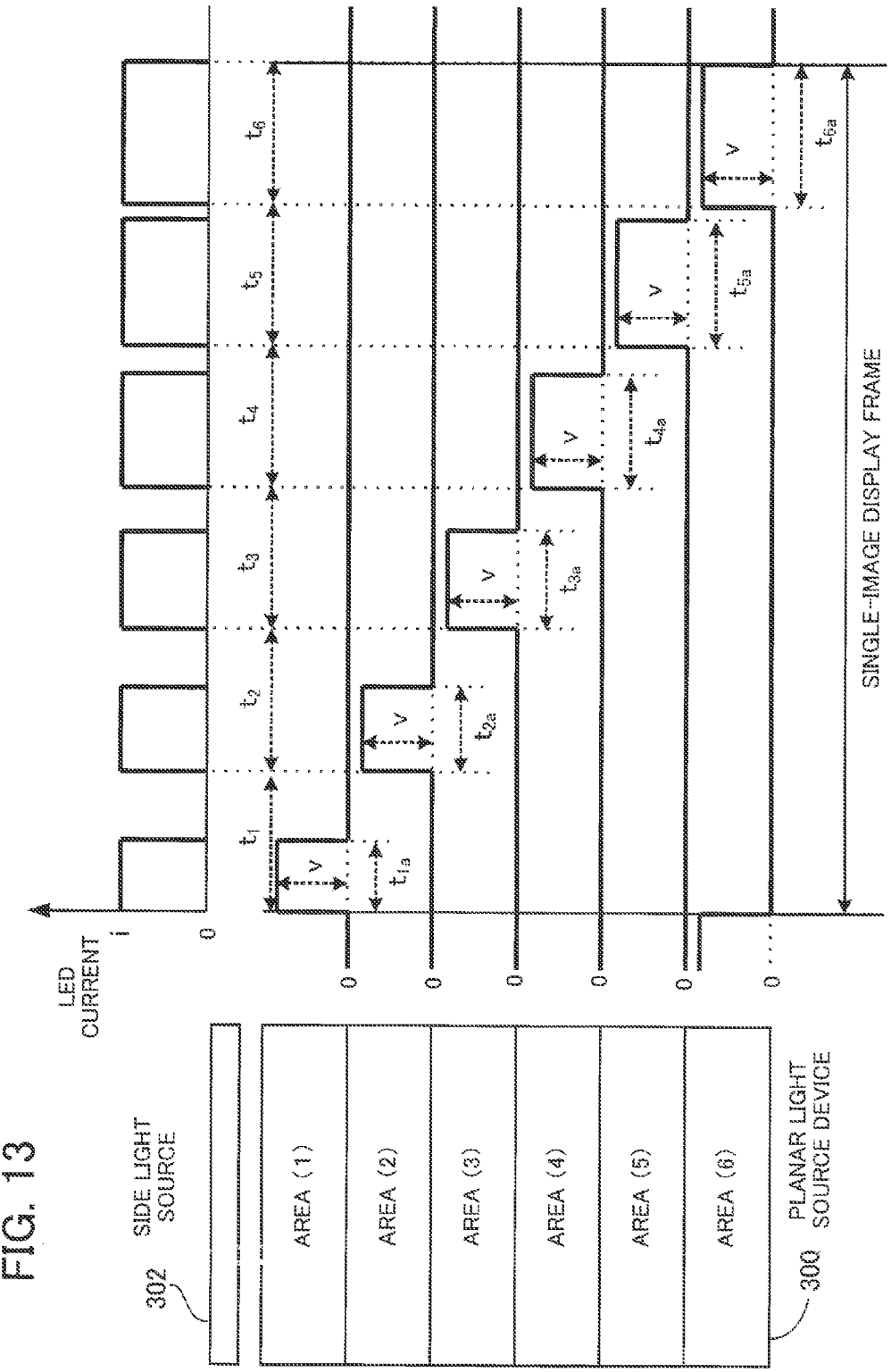
FIG. 13 illustrates a drive pattern according to the second embodiment in which the duration of the electric field application period is changed.

Alternatively, as illustrated in FIG. 13, the drive pattern determination unit 123 may determine a drive pattern that compensates for the light attenuation that occurs depending on the distance by correcting the difference between the target requested luminance value and the light source lookup table with the duration of the period in which the target light modulation layer is maintained in the scattering state.

Namely, the drive pattern determination unit 123 maintains, throughout the areas, the intensity of the electric field and the light emission output level of the side light source 302 while the target light modulation layer is in the scattering state. However, the drive pattern determination unit 123 changes only the duration of the electric field application period (the duration of period in which the inter-electrode voltage difference is generated). Namely, the drive pattern determination unit 123 corrects the light attenuation that occurs depending on the distance by changing the duration of the period (control period) in which the target light modulation layer 314 is maintained in the scattering state within the corresponding scattering control period.

With this drive pattern determined by the drive pattern determination unit 123, for example, an electric field corresponding to an inter-electrode voltage difference v is generated in the light modulation layer 314 of the area (1) in a control period $t_{1a}$ in the scattering control period $t_1$, and the side light source 302 emits light having the output level corresponding to the LED current i. In addition, the electric field corresponding to the inter-electrode voltage difference v is generated in the light modulation layer 314 of the area (2) in a control period $t_{2a}$ ($>t_{1a}$) in the scattering control period $t_2$, and the side light source 302 emits the light having the output level corresponding to the LED current i. Likewise, the electric field corresponding to the inter-electrode voltage difference v is generated in the light modulation layers 314 of the areas (3) to (6) in control periods $t_{3a}$ to $t_{6a}$ ($t_{2a}<t_{3a}<t_{4a}<t_{5a}<t_{6a}$) in the scattering control periods $t_3$ to $t_6$, respectively. The side light source 302 emits the light having the output level corresponding to the LED current i. If a light modulation layer 314 is maintained in the scattering state in a longer period, more light is emitted from the corresponding area.

In this way, by controlling the duration of the period in which the inter-electrode voltage difference is generated in the target area on the basis of the distance between the target area and the side light source 302, the light attenuation in the planar light source device 300 that occurs depending on the distance is corrected by the duration of the period in which the target light modulation layer is maintained in the scattering state.

As a result, the planar light source device 300 prevents the intensity of the light emitted from an individual area from changing from the corresponding requested intensity because of the light attenuation that occurs depending on the distance. In addition, an individual area of the planar light source device 300 emits light having a desired luminance to the image display panel 200.

The above description has been made assuming that uniform light is emitted from all the light emission surfaces (assuming that the image analysis unit 121 calculates a requested luminance value corresponding to all the light emission surfaces). However, like processing is also applicable to a case in which an individual area is caused to emit light having a different luminance. In addition, like processing is also applicable to a case in which a different LED current is supplied to each of the light sources 303a to 303j, an individual area is divided into 2D array blocks in a direction in parallel to the direction in which the light travels, and the planar light source device 300 emits light whose luminance is controlled per 2D array block.

While three cases in which the light attenuation that occurs depending on the distance is corrected by the light emission output level of the side light source 302, by the intensity of the electric field, and by the duration of the electric field application period have thus been described, these cases may suitably be combined.

Figure 14:
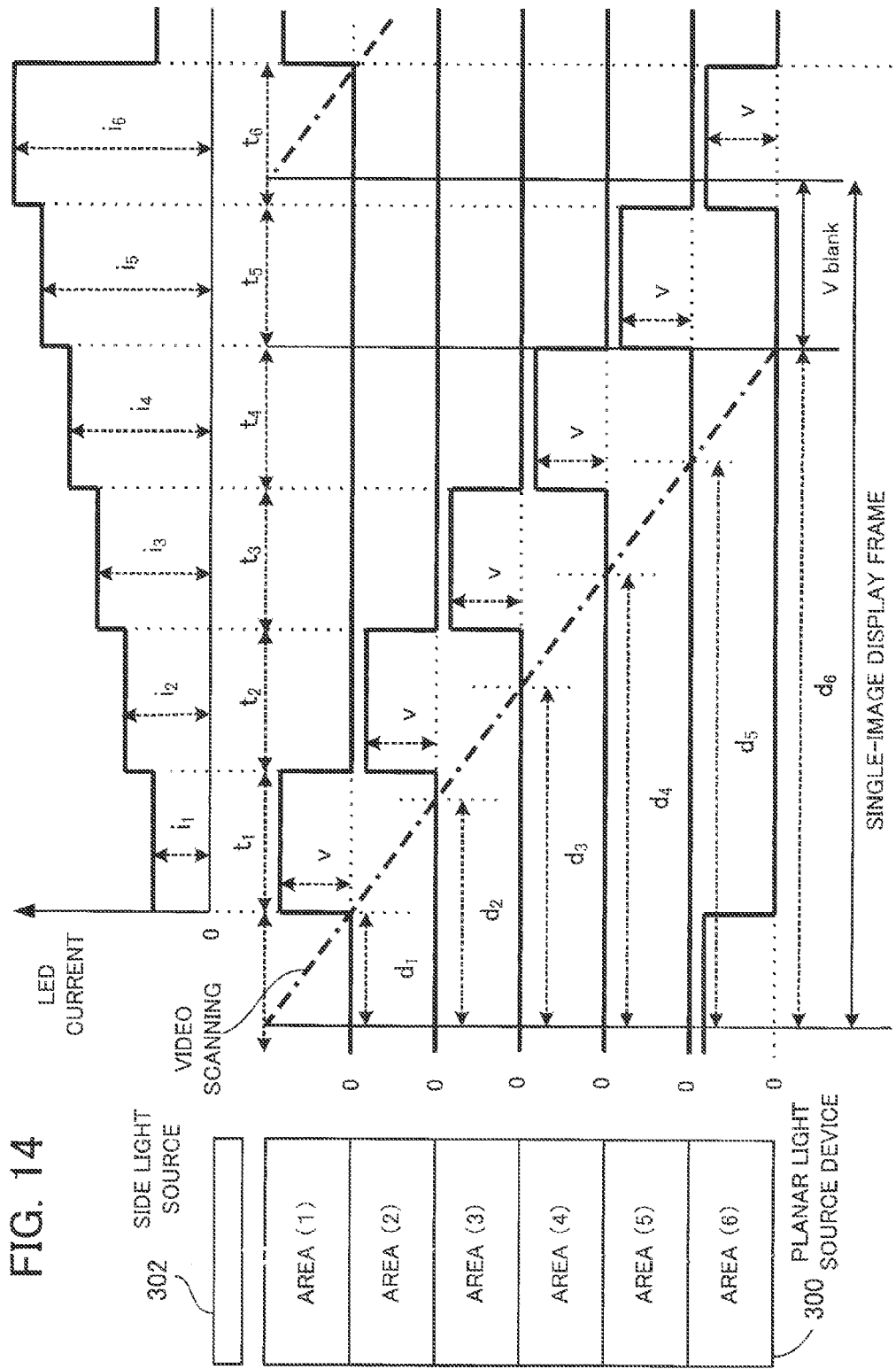
FIG. 14 illustrates emission and video scanning timings according to the second embodiment.

Next, the timing of the emission scanning for bringing an individual light modulation layer in the scattering state and the timing of the video scanning on pixels 201 corresponding to an individual area of the image display panel 200 will be described with reference to FIG. 14. FIG. 14 illustrates emission and video scanning timings according to the second embodiment. More specifically, FIG. 14 illustrates emission and video scanning timings when the planar light source device 300 is driven with the drive pattern in FIG. 11.

When a period $d_1$ elapses from the start, the image display panel drive unit 400 ends the video scanning on all the pixels in the image display panel 200 that correspond to the area (1) (hereinafter, pixels (1)). When a period $d_2$ elapses from the start, the image display panel drive unit 400 ends the video scanning on all the pixels in the image display panel 200 that correspond to the area (2) (hereinafter, pixels (2)). Likewise, when periods $d_3$ to $d_6$ elapse from the start, the image display panel drive unit 400 ends the video scanning on all the pixels in the image display panel 200 that correspond to the areas (3) to (6) (hereinafter, pixels (3) to (6)), respectively. When the period $d_6$ elapses from the start, the image display panel drive unit 400 ends the video scanning in this single-image display frame. Next, when a period V blank elapses, the image display panel drive unit 400 starts the video scanning in the next single-image display frame.

On the basis of the timing signal, the planar light source device drive unit 500 starts emission scanning (brings the target light modulation layer in the scattering state). After the video scanning on all the pixels corresponding to an area is ended, the period in which light is emitted from the area is started. Namely, the planar light source device drive unit 500 controls the planar light source device 300 so that the emission scanning on an area is not performed while the video scanning on the area is being performed.

For example, when the period $d_1$ elapses from the start of the video scanning in the single-image display frame, the planar light source device drive unit 500 starts the emission scanning in the single-image display frame. When the period $d_1$ elapses from the start of the video scanning in the next single-image display frame, the planar light source device drive unit 500 ends the emission scanning in the single-image display frame and starts the emission scanning in the next single-image display frame.

Specifically, between the end of the video scanning on all the pixels (1) in the current single-image display frame and the start of the video scanning on the pixels (1) in the next single-image display frame, the planar light source device drive unit 500 performs the emission scanning on the area (1) in the current single-image display frame.

Between the end of the video scanning on all the pixels (2) in the current single-image display frame and the start of the video scanning on the pixels (2) in the next single-image display frame, the planar light source device drive unit 500 performs the emission scanning on the area (2) in the current single-image display frame. Likewise, between the end of the video scanning on all the pixels (3) to (6) in the current single-image display frame and the start of the video scanning on the pixels (3) to (6) in the next single-image display frame, the planar light source device drive unit 500 performs the emission scanning on the areas (3) to (6) in the current single-image display frame, respectively.

With these video and emission scanning timings, the display apparatus 100 performs the emission scanning on an area after the video scanning on the pixels 201 of the image display panel 200 that correspond to the area, without fail. Thus, with the display apparatus 100 configured in this way, while the video scanning is being performed on pixels 201 of the image display panel 200, light is not emitted to the pixels 201. As a result, it is possible to prevent the display apparatus 100 from producing defocused moving images.

With the above timings, each time an image signal corresponding to an area in a single-image display frame is input, the image analysis unit 121 may analyze the input image signal and calculate the corresponding requested luminance. The drive pattern determination unit 123 may determine a drive pattern by using the requested luminance value.

Since the image signals are sequentially input, when the video scanning in a single-image display frame is started, the images of the portions corresponding to the respective areas of the image display panel 200 in the single-image display frame have not been determined yet. Thus, when the video scanning in a single-image display frame is started, the image analysis unit 121 cannot calculate the requested luminance values of the respective areas by analyzing the image signals corresponding to the respective areas in the single-image display frame.

However, in the above case, the emission scanning on an area in a single-image display frame is performed after the video scanning on the pixels 201 corresponding to the area of the image display panel 200 in the single-image display frame is ended. Namely, an image signal corresponding to an area is input to the image analysis unit 121 before the emission scanning on the area is performed.

Thus, before the emission scanning on an area in a single-image display frame is performed, the image analysis unit 121 analyzes an image signal corresponding to the area in the single-image display frame and calculates a requested luminance value corresponding to the area. In this way, the drive pattern determination unit 123 acquires a requested luminance value corresponding to an area, the value obtained by the image analysis unit 121 through analysis of the image of the portion corresponding to the area, before the emission scanning. Thus, the drive pattern determination unit 123 determines a drive pattern for the area.

Namely, for an image displayed in the current single-image display frame, the drive pattern determination unit 123 determines a drive pattern by using the requested luminance values corresponding the respective areas, which are more suitable than the requested luminance values calculated by the image analysis unit 121 through analysis of an image signal in the previous single-image display frame. As a result, the display apparatus 100 produces images having better image quality.

Third Embodiment

Next, a display apparatus according to a third embodiment will be described. On the basis of an image signal analysis result obtained by the image analysis unit, a planar light source device drive unit in the display apparatus according to the third embodiment increases the contrast (dynamic range) between the light emitted from a partial area of a light emission surface and the light emitted from another area of the light emission surface.

For example, when the requested luminance value of an area is a value corresponding to white (a value corresponding to the maximum luminance) and when the luminance difference from the requested luminance values of the areas located around this area is a predetermined value or more, the image analysis unit requests a luminance value higher than the value corresponding to white as the requested luminance value of this area.

The display apparatus according to the third embodiment has the same configuration as that of the display apparatus 100 according to the second embodiment. Thus, the same elements between the second and third embodiments are denoted by the same reference characters, and redundant description will be avoided.

Figure 15:
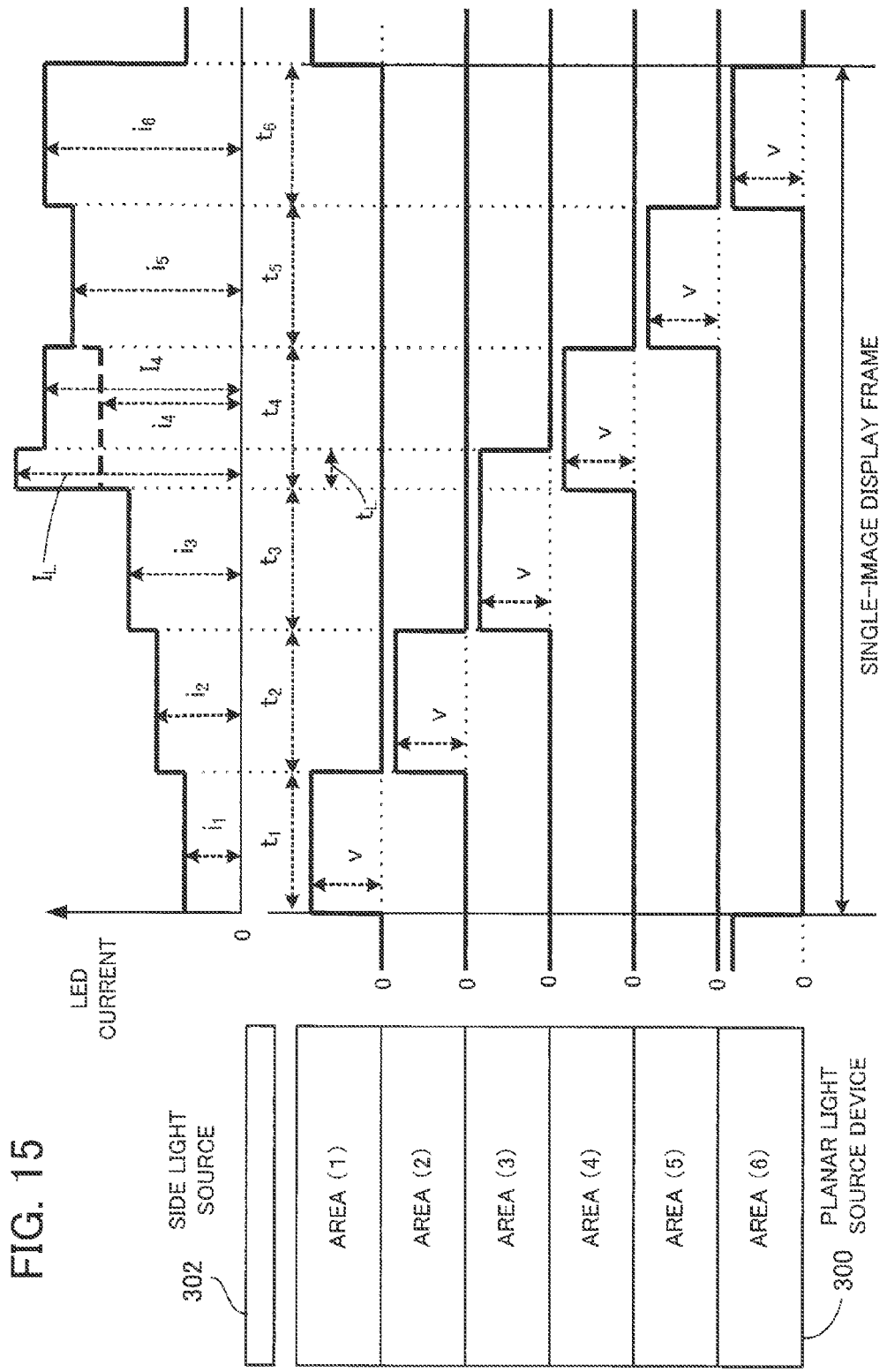
FIG. 15 illustrates a drive pattern according to a third embodiment for increasing the contrast between the light emitted from a partial area of a light emission surface and the light emitted from another area.
Figure 16A:
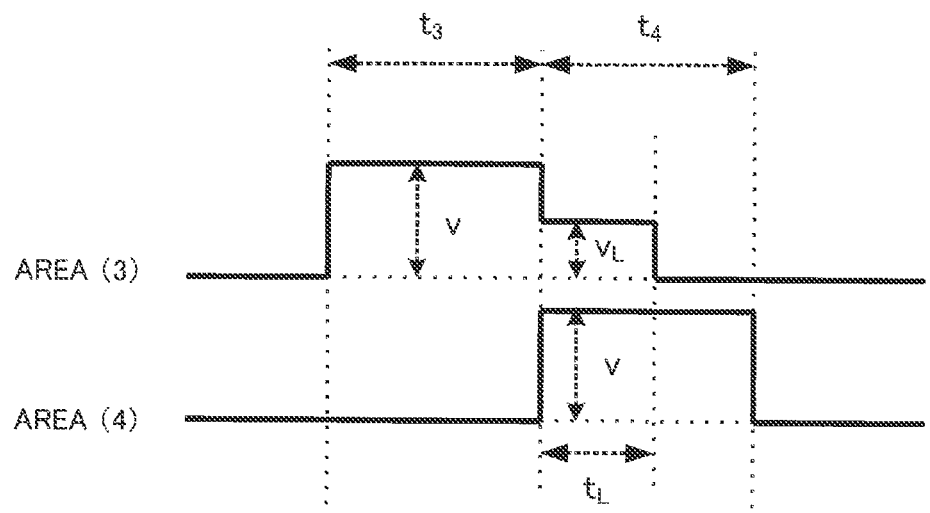
FIGS. 16A and 16B illustrate variations of the voltage difference between electrodes at an overlapping portion according to the third embodiment.
Figure 16B:
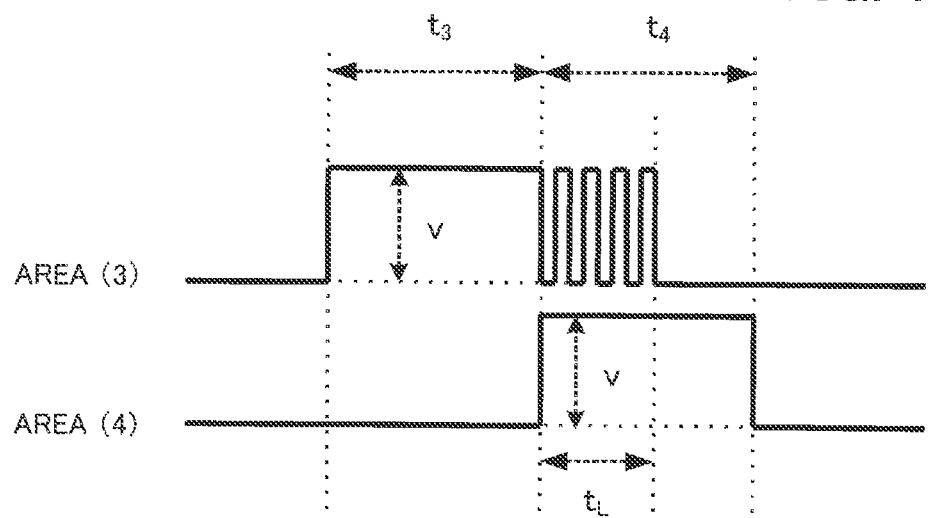

A drive pattern in which the contrast between the light emitted from a partial area of the light emission surface of the planar light source device 300 and the light emitted from another area of the light emission surface is increased will be described with reference to FIGS. 15, 16A, and 16B. FIG. 15 illustrates a drive pattern according to the third embodiment for increasing the contrast between the light emitted from a partial area of a light emission surface and the light emitted from another area. Specifically, FIG. 15 illustrates a case in which light having a high luminance is emitted from the area (3) in FIG. 11. FIGS. 16A and 16B illustrate variations of the inter-electrode voltage difference at an overlapping portion according to the third embodiment.

The drive pattern determination unit 123 sets the periods $t_1$ to $t_6$ in a time-sharing manner and determines a drive pattern in which the electric field application period of the area (3) overlaps the electric field application period $t_4$ of the area (4) by a period $t_L$.

With this drive pattern determined by the drive pattern determination unit 123, the side light source 302 emits light having an output level corresponding to an LED current $I_L$ in the period $t_L$. The value of the LED current $I_L$ is determined by the drive pattern determination unit 123 so that the luminance corresponding to the difference between the requested luminance corresponding to the area (3) and the luminance given in the period $t_3$ is satisfied in the period $t_L$. For example, the drive pattern determination unit 123 sets the LED current $I_L$ to be larger than any of the LED currents $i_1$ to $i_6$. Consequently, the drive pattern determination unit 123 shortens the overlapping period $t_L$.

With this drive pattern determined by the drive pattern determination unit 123, when the period $t_L$ in the period $t_4$ elapses, the side light source 302 emits light having an output level corresponding to the LED current $I_4$ ($>i_4$). This current $i_4$ is the LED current in the period $t_4$ when the overlapping is not performed in the period $t_L$. This is because, since the light is emitted from the area (3) located closer to the side light source 302 than the area (4) in the period $t_L$, the light does not contribute to the luminance from the area (4) in the period $t_L$ very much.

With this drive pattern, the planar light source device 300 increases the luminance of the light emitted from the area (3) while satisfying the requested luminance values of the respective areas. Namely, the planar light source device 300 increases the contrast (dynamic range) between the light emitted from the area (3) and the light emitted from the other areas.

In the above description, the light attenuation that occurs depending on the distance is corrected by the light emission level of the side light source 302. However, the light attenuation may be corrected by the intensity of the electric field or the duration of the electric field application period.

As illustrated in FIG. 16A, the drive pattern determination unit 123 may determine a drive pattern in which an inter-electrode voltage difference $v_L$ corresponding to the area (3) in the period $t_L$ is smaller than the inter-electrode voltage difference $v$ in the period $t_3$. In this drive pattern, the scattering degree of the light modulation layer of the area (3) in the period $t_L$ is smaller than that of the light modulation layer in the period $t_3$.

By controlling the value of the inter-electrode voltage difference $v_L$ of the area (3) in this way, the drive pattern determination unit 123 controls the luminance of the light emitted from the area (4) in the period $t_L$. Namely, by setting the inter-electrode voltage difference $v_L$ corresponding to the area (4) to be smaller than the voltage difference $v$, the drive pattern determination unit 123 sets the value of the LED current $I_4$ that is caused to flow to satisfy the corresponding requested luminance value to be smaller.

Alternatively, as illustrated in FIG. 16B, the drive pattern determination unit 123 may determine a drive pattern in which the inter-electrode voltage difference $v$ is generated on the basis of pulse width modulation (PWM) in the area (3) in the period $t_L$. With this drive pattern, the light modulation layer of the area (3) is alternately switched between the scattering state and the transmission state in the period $t_L$ at predetermined time intervals. By generating the inter-electrode voltage difference $v$ in the area (3) on the basis of PWM, the drive pattern determination unit 123 controls the luminance of the light emitted from the area (4) in the period $t_L$ and sets the value of the LED current $I_4$ that is caused to flow to satisfy the corresponding requested luminance value to be smaller. The drive patterns illustrated in FIGS. 16A and 16B may be combined.

Fourth Embodiment

Figure 17:
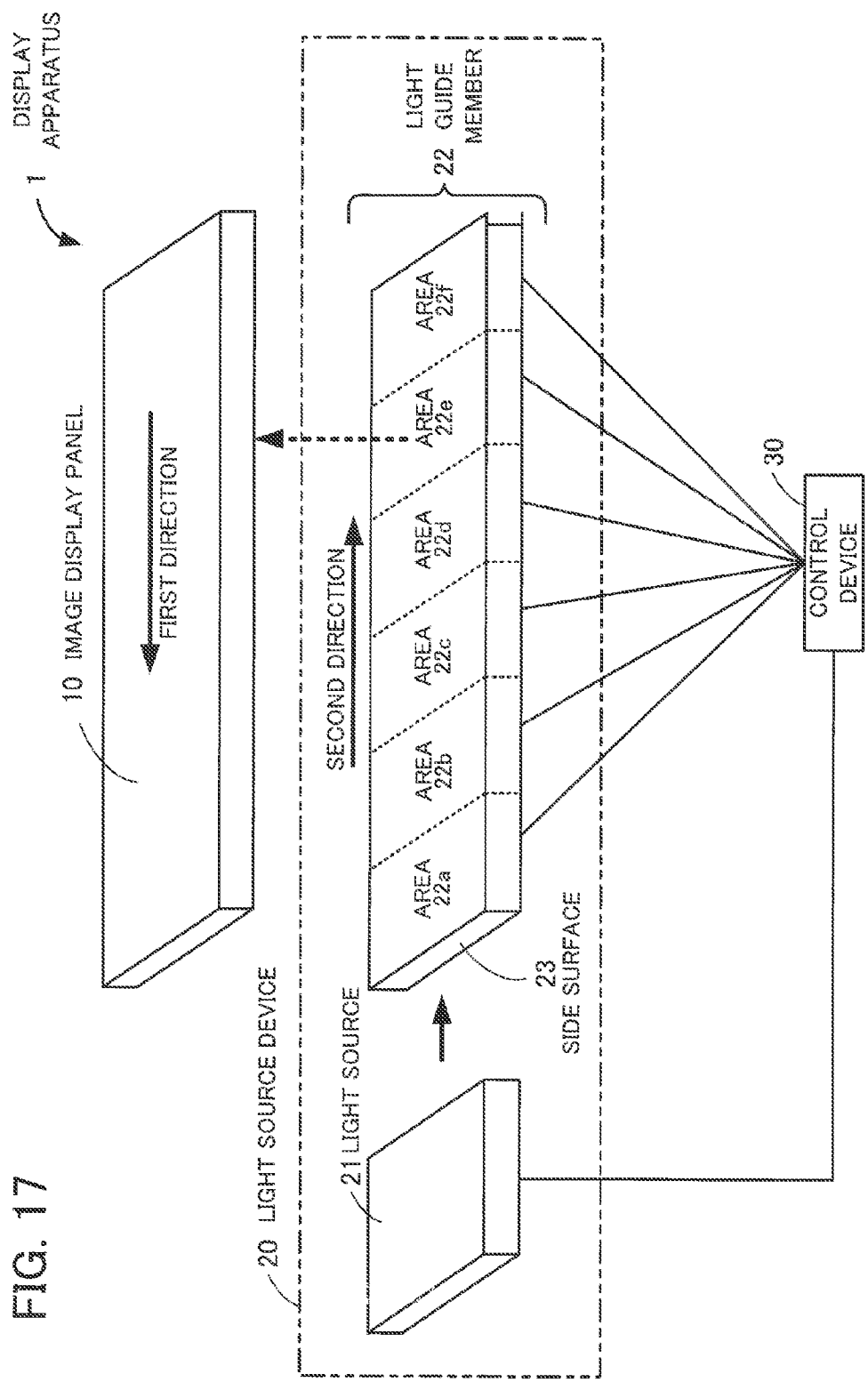
FIG. 17 illustrates an example of a configuration of a display apparatus according to a fourth embodiment.

A display apparatus according to a fourth embodiment will be described with reference to FIG. 17. FIG. 17 illustrates an example of a configuration of a display apparatus 1 according to the fourth embodiment.

The display apparatus 1 includes an image display panel 10, a light source device 20, and a control device 30.

The image display panel 10 displays predetermined images and sequentially performs display scanning in a first direction.

The light source device 20 emits light to the image display panel 10. The light source device 20 includes a light source 21 and a light guide member 22. The light source 21 emits light.

The light guide member 22 is arranged on the back surface side of the image display panel 10 as seen from the display surface, receives the light emitted from the light source 21 via a side surface 23 with respect to a surface of the light guide member 22, the surface facing the image display panel 10, guides the light in a second direction opposite to the first direction, and emits the light to the image display panel 10. The light guide member 22 has a plurality of divided areas (22a to 22f) arranged in the second direction (the direction in which the light travels). Each of the areas includes a light modulation layer brought in a transmission state in which the light is transmitted through the light modulation layer or in a scattering state in which the light is scattered in the light modulation layer.

For example, an individual light modulation layer is a polymer-dispersed liquid crystal layer. When an electric field is applied in the light modulation layer, the light modulation layer is brought in the scattering state. Otherwise, the light modulation layer is maintained in the transmission state. Thus, when the light modulation layer of an area is in the transmission state, the light is transmitted through this area and travels to its neighboring area (in the second direction). When the light modulation layer of an area is in the scattering state, the light is scattered in this light modulation layer, and part of the scattered light is emitted from this area to the image display panel 10.

The control device 30 controls the light source device 20. The control device 30 applies an electric field in the light modulation layer of an individual area in a corresponding scattering control period. In this way, the control device 30 brings the light modulation layer of an individual area in the scattering state. The scattering control periods of the light modulation layers of the areas are sequentially set in the first direction so that any one of the scattering control periods does not temporally overlap the other scattering control periods. Namely, the control device 30 sequentially brings the light modulation layers of the respective areas in the scattering state so that no two scattering control periods temporally overlap (the control device 30 brings the light modulation layer of only one area in the scattering state at one time).

In this way, the control device 30 brings the light modulation layers of the areas in the scattering state in the respective scattering control periods. Namely, the light source device 20 performs partial drive in which the light modulation layers of the areas are sequentially brought in the scattering state and the areas sequentially emit light to the image display panel 10.

Next, a specific example in which the control device 30 brings the light modulation layers of the areas in the scattering state in the respective scattering control periods and the light source device 20 performs the partial drive will be described. For example, when the control device 30 generates an electric field in the light modulation layer of the area 22b and brings this light modulation layer in the scattering state, after the light emitted from the light source 21 enters the light guide member 22 via the side surface 23, the light passes through the area 22a whose light modulation layer is in the transmission state. Next, the light emitted from the light source 21 is scattered in the area 22b whose light modulation layer is in the scattering state. Of all the scattered light, some light traveling in the direction of the image display panel 10 is emitted from the area 22b to the image display panel 10.

When the control device 30 applies an electric field in the light modulation layer of the area 22e and brings this light modulation layer in the scattering state, after the light emitted from the light source 21 enters the light guide member 22 via the side surface 23, the light passes through the areas 22a to 22d whose light modulation layers are in the transmission state. Next, the light emitted from the light source 21 is scattered in the area 22e whose light modulation layer is in the scattering state. Of all the scattered light, some light traveling in the direction of the image display panel 10 is emitted from the area 22e to the image display panel 10.

Thus, if the area that emits the light to the image display panel 10 is located farther from the side surface 23, the light emitted from the light source 21 passes through more areas until being emitted from the light guide member 22, compared with the case where the light modulation layers corresponding to the areas 22a to 22d are brought in the scattering state. However, it is known that intensity of the light could change (attenuate) when the light passes through an area. For example, the intensity of the light is the luminance or brightness of the light.

Thus, if the control device 30 causes the light source device 20 to perform partial drive by applying the same drive conditions to all the areas, each of the areas of the light guide member 22 could emit light having a different intensity level. Thus, it is desirable that the control device 30 perform a different control operation per area.

To address this, on the basis of the intensity of the light emitted from an individual area to the image display panel in the corresponding scattering control period, the control device 30 brings the target light modulation layer in the scattering state in the corresponding period based on the distance between the side surface 23 and the target area.

More specifically, to cause each of the areas to emit light having a predetermined intensity, the control device 30 controls the duration of the electric field application period so that the period in which the target light modulation layer is maintained in the scattering state is increased with the increase of the distance between the side surface 23 and the target area whose light modulation layer is brought in the scattering state.

In this way, on the basis of the intensity of the light emitted from an individual area to the image display panel, the control device 30 maintains the target light modulation layer in the scattering state for the duration of the period based on the distance between the side surface 23 and the target area. Thus, the control device 30 maintains the light intensity among the areas at the same level.

Namely, when the control device 30 causes the light source device 20 to perform partial drive, the control device 30 prevents the intensity of the light emitted from an individual area from deviating from a desired intensity. As a result, the display apparatus 1 prevents deterioration in image quality.

Fifth Embodiment

Next, a fifth embodiment will be described. In the second embodiment, the side light source 302 is arranged with respect to the image display panel 200 so that the video scanning based on the video signals is performed sequentially from the area closest to the side light source 302 to the area farthest from the side light source 302. The fifth embodiment differs from the second embodiment in that the side light source 302 is arranged with respect to the image display panel 200 so that the video scanning based on the video signals is performed sequentially from the area farthest from the side light source 302 to the area closest to the side light source 302. In addition, in the second embodiment, numbers are sequentially given from the area closest to the side light source 302 to the area farthest from the side light source 302. However, in the fifth embodiment, numbers are sequentially given from the area farthest from the side light source 302 to the area closest to the side light source 302.

Other than the above feature, the display apparatus according to the fifth embodiment is configured in the same way as that of the display apparatus 100 according to the second embodiment. Thus, the same elements between the second and fifth embodiments are denoted by the same reference characters, and redundant description will be avoided.

Figure 18:
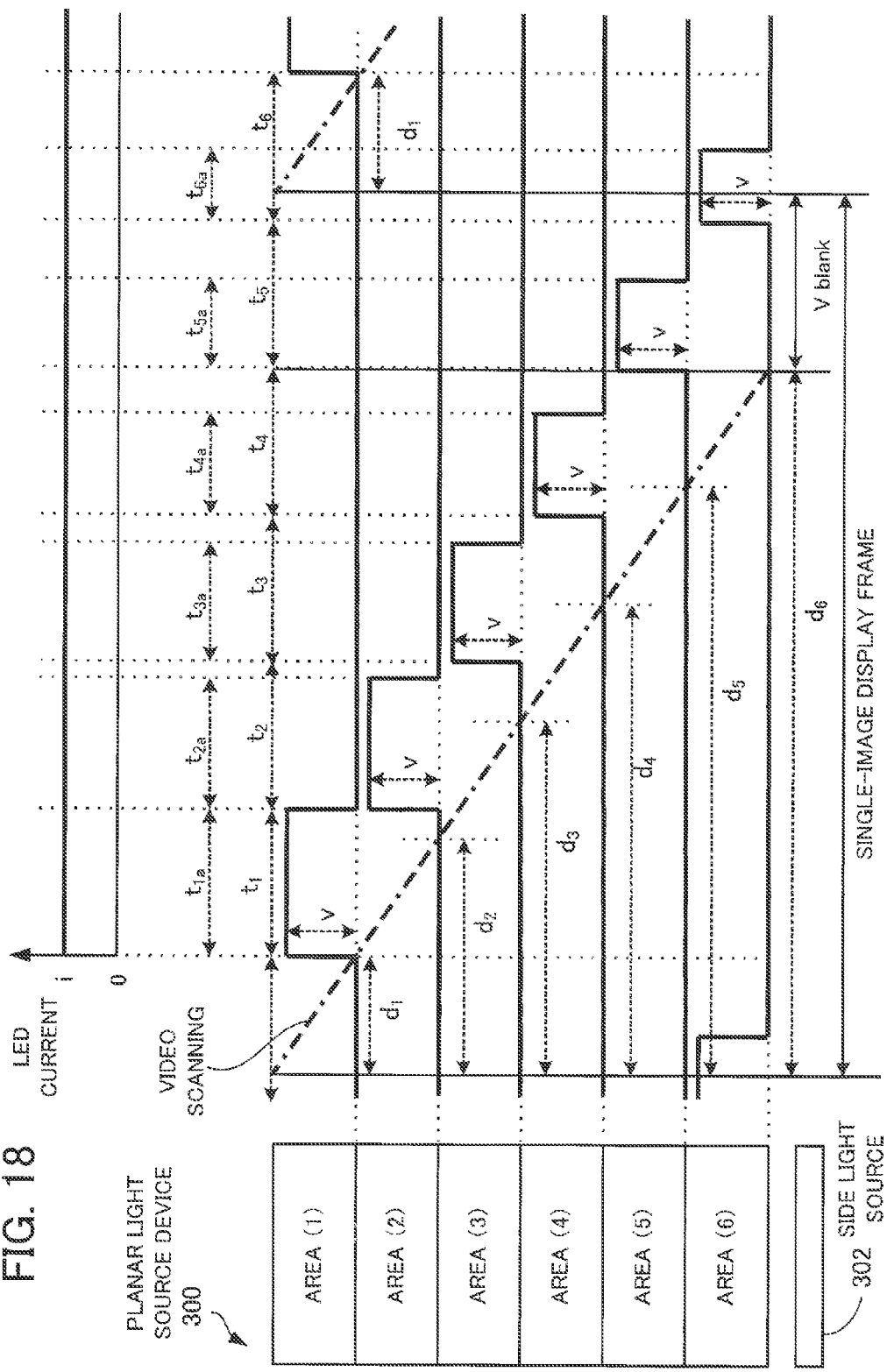
FIG. 18 illustrates a drive pattern of a planar light source device according to a fifth embodiment.

Hereinafter, a drive pattern according to the fifth embodiment will be described with reference to FIG. 18. FIG. 18 illustrates a drive pattern of the planar light source device 300 according to the fifth embodiment. FIG. 18 illustrates a drive pattern in which all the light emission surfaces of the planar light source device 300 uniformly emits light having a maximum luminance (white).

FIG. 18 includes a graph of the LED current. In this graph, the horizontal axis indicates time and the vertical axis indicates the value of the current supplied to the light sources 303a to 303j. In FIG. 18, a certain LED current i is constantly supplied to the light sources 303a to 303j, and the side light source 302 emits light having a luminance corresponding to the LED current i to the light guide member 310.

In addition, a dashed-dotted line in FIG. 18 indicates the video scanning timing in a single-image display frame. As illustrated in FIG. 18, when a period $d_1$ elapses from the start, the image display panel drive unit 400 ends the video scanning on all the pixels of the image display panel 200 that correspond to the area (1) (hereinafter, pixels (1)). When a period $d_2$ elapses from the start, the image display panel drive unit 400 ends the video scanning on all the pixels of the image display panel 200 that correspond to the area (2) (hereinafter, pixels (2)). Likewise, when periods $d_3$ to $d_6$ elapse from the start, the image display panel drive unit 400 ends the video scanning on all the pixels of the image display panel 200 that correspond to the areas (3) to (6) (hereinafter, pixels (3) to (6)), respectively.

When the period $d_6$ elapses from the start, the image display panel drive unit 400 ends the video scanning on the image display panel 200 in this single-image display frame. Next, when a period V blank elapses, the image display panel drive unit 400 starts the video scanning in the next single-image display frame.

In addition, $t_1$ to $t_6$ illustrated in FIG. 18 indicate the scattering control periods of the areas, respectively. Each of the periods is given as a period in which a corresponding light modulation layer 314 in the planar light source device 300 is maintained in the scattering state and a corresponding area emits light.

The total duration of the scattering control periods $t_1$ to $t_6$ is the same as the length of a single-image display frame. In FIG. 18, each of the scattering control periods $t_1$ to $t_6$ is set by dividing the length of a single-image display frame by 6, which is the number of the areas. In addition, each of the scattering control periods $t_1$ to $t_6$ of the areas is set so that, while the video scanning on an area is being performed, the emission scanning on the area is not performed (the period in which light is emitted from an area comes after the period in which the video scanning on all the pixels corresponding to the area is ended).

The scattering control periods $t_1$ to $t_6$ start when the period $d_1$ elapses after the start of the video scanning (after the video scanning on the area (1) is ended) and end when the period $d_1$ elapses after the start of the video scanning in the next single-image display frame. Namely, in FIG. 18, the emission scanning lags the video scanning by the period $d_1$.

With these video and emission scanning timings, the display apparatus 100 performs the emission scanning on an area after the video scanning on the pixels 201 of the image display panel 200 that correspond to the area is ended, without fail. Thus, with these timings, while the video scanning is being performed on pixels 201 of the image display panel 200, the planar light source device 300 does not emit light to the pixels 201. As a result, it is possible to prevent the display apparatus 100 from producing defocused moving images.

In addition, with the above timings, each time an image signal corresponding to an area in a single-image display frame is input, the image analysis unit 121 may analyze the input image signal and calculate the corresponding requested luminance. The drive pattern determination unit 123 may determine a drive pattern by using the requested luminance value. Since the image signals are sequentially input, when the video scanning in a single-image display frame is started, the images of the portions corresponding to the respective areas of the image display panel 200 in the single-image display frame have not been determined yet. Thus, when the video scanning in a single-image display frame is started, the image analysis unit 121 cannot calculate the requested luminance values of the respective areas by analyzing the image signals corresponding to the respective areas in the single-image display frame. However, in the above case, the emission scanning on an area in a single-image display frame is performed after the video scanning on the pixels 201 corresponding to the area of the image display panel 200 in the single-image display frame is ended. Namely, an image signal corresponding to an area is input to the image analysis unit 121 before the emission scanning on the area is performed.

Thus, before the emission scanning on an area in a single-image display frame is performed, the image analysis unit 121 analyzes an image signal corresponding to the area in the single-image display frame and calculates a requested luminance value corresponding to the area. In this way, the drive pattern determination unit 123 acquires a requested luminance value corresponding to an area, the value obtained by the image analysis unit 121 through analysis of the image of the portion corresponding to the area, before the emission scanning. Thus, the drive pattern determination unit 123 determines a drive pattern for the area.

Namely, for an image displayed in the current single-image display frame, the drive pattern determination unit 123 determines a drive pattern by using the requested luminance values corresponding the respective areas, which are more suitable than the requested luminance values calculated by the image analysis unit 121 through analysis of an image signal in the previous single-image display frame. As a result, the display apparatus 100 produces images having better image quality.

In addition, an electric field corresponding to a voltage difference v is generated in the light modulation layer 314 of the area (1) in a period $t_{1a}$ in the scattering control period $t_1$ ($t_1 = t_{1a}$) in FIG. 18, and the light modulation layer 314 is brought in the scattering state. In addition, light corresponding to the LED current i is emitted to the light guide member 310.

Likewise, the electric field corresponding to the voltage difference v is generated in the light modulation layer 314 of the area (2) in a period $t_{2a}$ ($> t_{1a}$) in the scattering control period $t_2$ in FIG. 18, and the light modulation layer 314 is brought in the scattering state. In addition, light corresponding to the LED current i is emitted to the light guide member 310. Likewise, the electric field corresponding to the voltage difference v is generated in the light modulation layers 314 of the areas (3) to (6) in periods $t_{3a}$ to $t_{6a}$ in the scattering control periods $t_3$ to $t_6$ ($> t_{2a}$ to $t_{5a}$) in FIG. 18, respectively, and the light modulation layers 314 are brought in the scattering state, respectively. In addition, light corresponding to the LED current i is emitted to the light guide member 310.

Normally, the luminance of the light that has entered the light guide member 310 via the side surface thereof attenuates (decreases) as it travels through the light guide member 310 (as it travels away from the side surface). Thus, if the display apparatus 100 controls all the areas in the same control mode, light having a uniform luminance is not emitted from each of the light emission surfaces of the planar light source device 300. Namely, to cause each area to emit light having a desired luminance, it is desirable that the display apparatus 100 control the planar light source device drive unit 500 by taking into consideration the attenuation of the light (the decrease of the luminance) that occurs depending on the distance between the side surface and an individual area.

Thus, in FIG. 18, the display apparatus 100 drives the planar light source device 300 with a drive pattern in which the attenuation of the light that occurs depending on the distance is corrected by the duration of the period in which an individual light modulation layer 314 is maintained in the scattering state, on the basis of an individual requested luminance value and the light source lookup table.

Namely, the display apparatus 100 drives the planar light source device 300 with a drive pattern in which the value of the LED current and the intensity of the electric field are maintained throughout the areas and the duration of the electric field application period is changed.

In this way, depending on the distance between the side light source 302 and the target area, the duration of the period in which the target light modulation layer 314 is maintained in the scattering state is corrected. Namely, the display apparatus 100 corrects the light attenuation that occurs depending on the distance on the basis of the duration of the period in which the target light modulation layer 314 is maintained in the scattering state.

As a result, the display apparatus 100 prevents the luminance of the light emitted from an individual area from changing from the corresponding requested luminance because of the light attenuation that occurs depending on the distance. In addition, an individual area emits light having a desired luminance to the image display panel 200.

The above description has been made assuming that all the light emission surfaces emit uniform light (assuming that the image analysis unit 121 calculates a requested luminance value corresponding to all the light emission surfaces). However, like processing is also applicable to a case in which an individual area is caused to emit light having a different luminance. In addition, like processing is also applicable to a case in which a different LED current is supplied to each of the light sources 303a to 303j, an individual area is divided into 2D array blocks in a direction in parallel to the direction in which the light travels, and the planar light source device 300 emits light whose luminance is controlled per 2D array block.

As illustrated in FIG. 18, when the LED current of the side light source 302 is fixed, each of the scattering control periods $t_1$ to $t_6$ has an equal duration, and light having the uniform maximum luminance is emitted from all the light emission surfaces to the image display panel 10, the luminance is determined depending on the area (1) that is farthest from the side light source 302. Namely, the luminance obtained when the light modulation layer 314 of the area (1) is maintained in the scattering state in the scattering control period $t_1$ is used as a benchmark. Since an area located closer to the side light source 302 receives light having higher luminance, the period (control period), in which the corresponding light modulation layer 314 is maintained in the scattering state, in the scattering control period is shortened ($t_{1a} > t_{2a} > t_{3a} > t_{4a} > t_{5a} > t_{6a}$). Namely, in the period obtained by subtracting the period $t_{2a}$ from the scattering control period $t_2$, regardless of the luminance of the light emitted, the light modulation layer 314 of the area (2) is not maintained in the scattering state (no light is emitted from the corresponding light emission surface). The same applies to the other areas.

Sixth Embodiment

Next, a sixth embodiment will be described. The same elements between the fifth and sixth embodiments are denoted by the same reference characters, and redundant description will be avoided. In the fifth embodiment illustrated in FIG. 18, to cause all the light emission surfaces of the planar light source device 300 to emit light having a uniform intensity (the maximum intensity), the luminance from the area (1) located farthest from the side light source 302 is used as a benchmark, and an idle period is set in each of the periods $t_2$ to $t_6$. In the idle periods, the light modulation layers 314 of the areas (2) to (6), which are located closer to the side light source 302 than the area (1) is, are not brought in the scattering state. In the sixth embodiment, the entire luminance is further improved with the same configuration as that in the fifth embodiment in which the scattering control periods are equally set.

Figure 19:
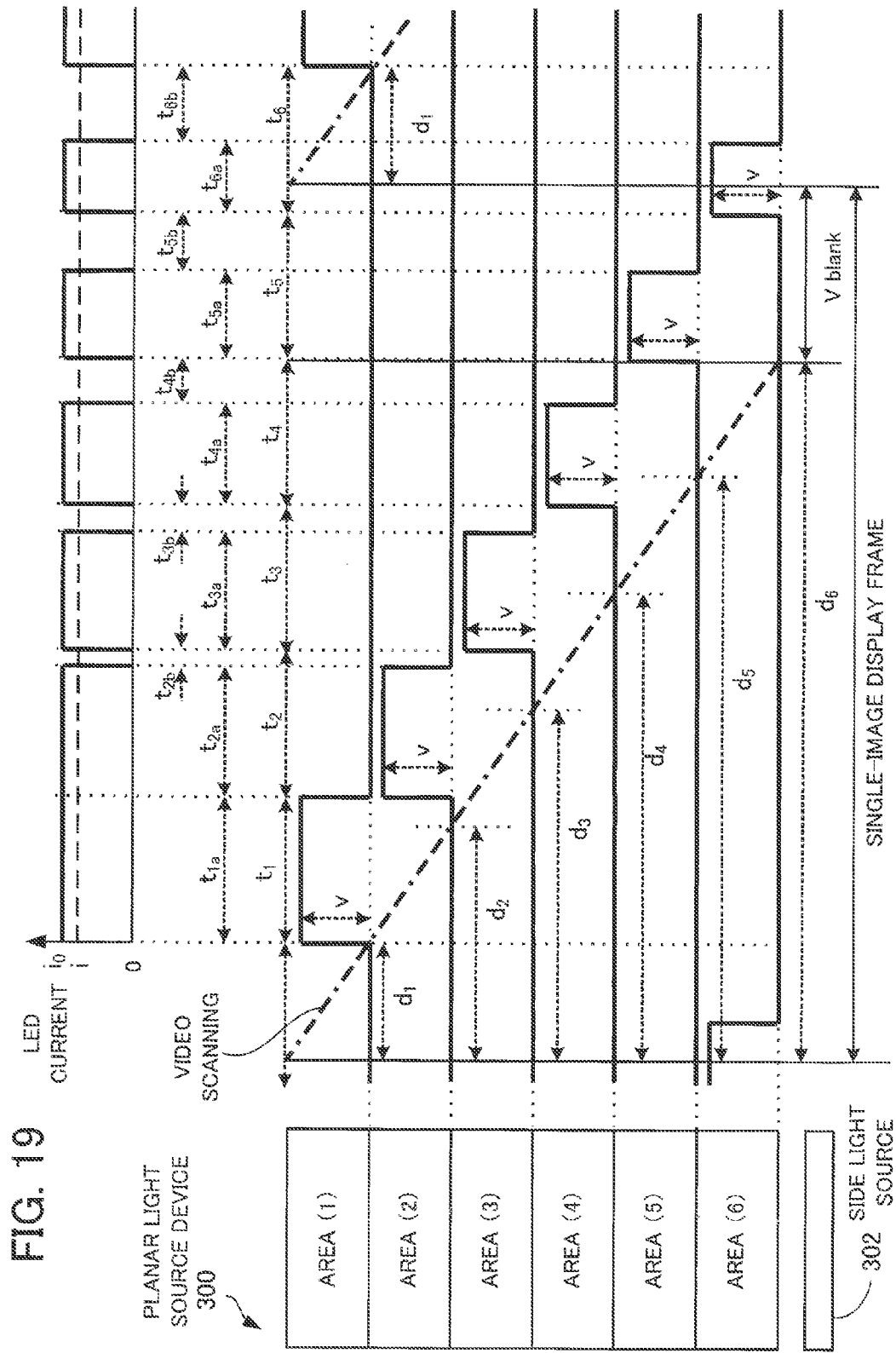
FIG. 19 illustrates a drive pattern of a planar light source device according to a sixth embodiment.

A specific drive pattern will be described with reference to FIG. 19. FIG. 19 illustrates a drive pattern of a planar light source device 300 according to the sixth embodiment. FIG. 19 illustrates a drive pattern in which all the light emission surfaces of the planar light source device 300 uniformly emit light having the maximum luminance (white). The following description will particularly be made with a focus on the differences from FIG. 18.

In FIG. 19, the scattering control periods $t_2$ to $t_6$ include idle periods $t_{2b}$ to $t_{6b}$, respectively. For example, the light sources 303a to 303j are turned off (the LED current is set to 0) in an idle period $t_{2b}$ in which the target light modulation layer 314 of the area (2) of the planar light source device 300 is not maintained in the scattering state. The same applies to the areas (3) to (6). For example, the planar light source device 300 brings the light modulation layer 314 of the area (1) in the scattering state in the control period $t_{1a}$ and supplies an LED current $i_0$ larger than the LED current i to the light sources 303a to 303j. The same applies to the areas (2) to (6).

Each of the idle periods is a period that does not contribute to the luminance of the constantly emitted light when light is emitted from the planar light source device 300. The idle period in a scattering control period is a remaining period obtained by subtracting the corresponding control period (the period in which the corresponding light modulation layer 314 is maintained in the scattering state to emit the maximum luminance) from the scattering control period. The areas located closer to the side light source 302 always include these idle periods, regardless of the luminance of the light emitted.

Normally, regarding the planar light source device 300, if a larger LED current is supplied to the light sources 303a to 303j, the side light source 302 emits light having a higher luminance to the light guide member 310. As a result, light having a higher luminance is emitted from an individual light emission surface. However, if the LED current supplied to the light sources 303a to 303j in FIG. 18 is simply changed from i to $i_0$ (>i), the allowable power dissipation of the light sources 303a to 303j could be exceeded.

Thus, in FIG. 19, the display apparatus 100 stops supplying the LED current to the light sources 303a to 303j in the idle periods. By supplying the LED current to the light sources 303a to 303j only in the control periods, the display apparatus 100 increases the value of the suppliable LED current, without exceeding the allowable power dissipation.

With this drive pattern, the display apparatus 100 increases the upper limit of the luminance of the light emitted from the planar light source device 300. In this way, while correcting the light attenuation that occurs depending on the distance between the target area and the side light source 302 by the duration of the period in which the target light modulation layer 314 is maintained in the scattering state, the planar light source device 300 of the display apparatus 100 emits light having a higher luminance. As a result, the display apparatus 100 prevents deterioration in image quality.

When causing an area to emit light having a luminance other than the maximum luminance, there are cases in which the target light modulation layer 314 is not brought in the scattering state in a part of the control period of the target area. In this case, the display apparatus 100 may stop supplying the LED current in this period.

Seventh Embodiment

Next, a seventh embodiment will be described. The same elements between the fifth and seventh embodiments are denoted by the same reference characters, and redundant description will be avoided. In the sixth embodiment, the display apparatus 100 stops supplying the LED current in the idle periods. By supplying the LED current only in the control periods, the display apparatus 100 increases the value of the suppliable LED current, without exceeding the allowable power dissipation. Consequently, light of a higher luminance is emitted.

In the seventh embodiment, the display apparatus 100 refers to the light source lookup table and further improves the entire luminance by providing areas with additional control periods in the idle periods.

Figure 20:
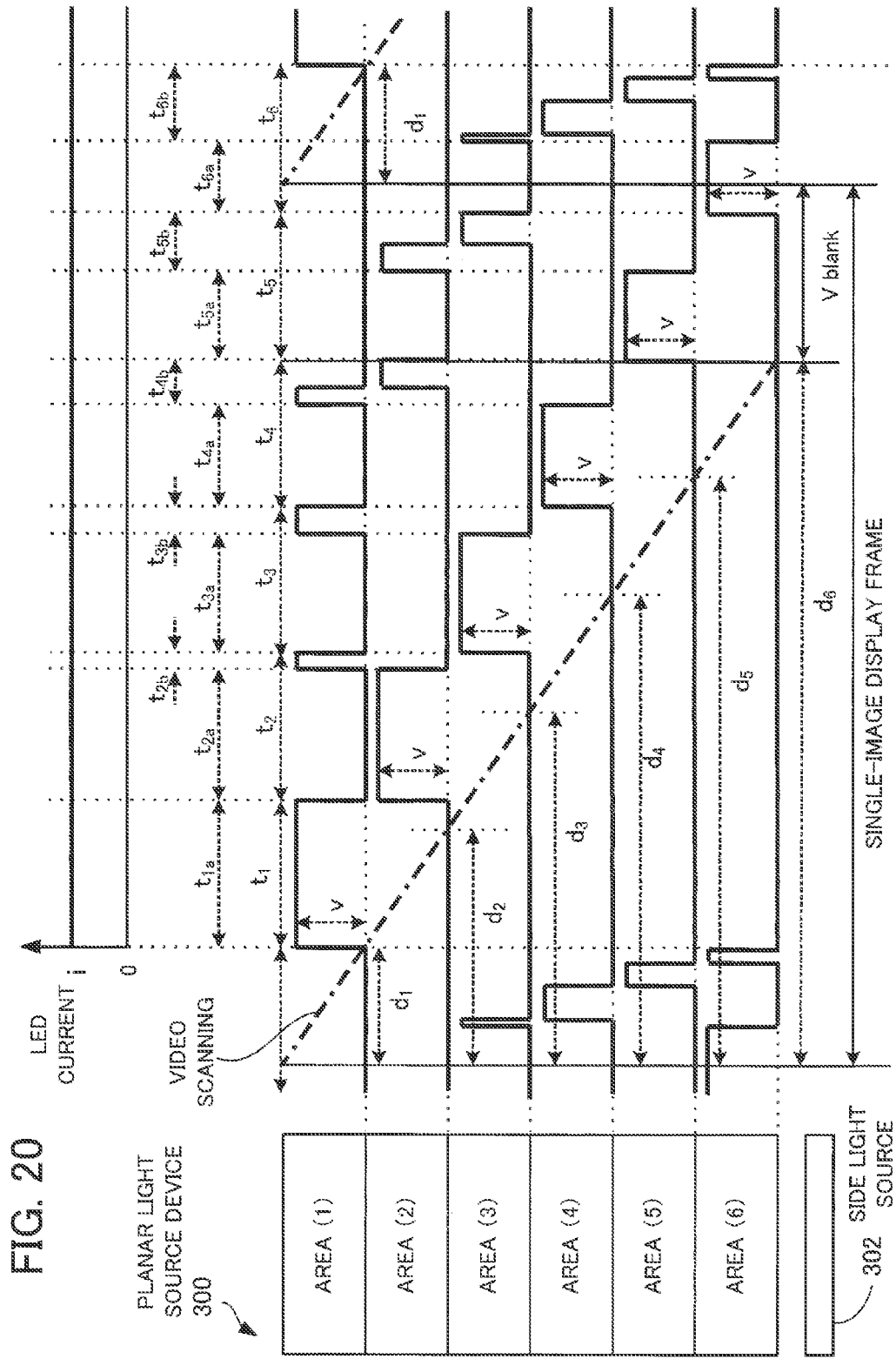
FIG. 20 illustrates a drive pattern of a planar light source device according to a seventh embodiment.

A specific drive pattern will be described with reference to FIG. 20. FIG. 20 illustrates a drive pattern of a planar light source device 300 according to the seventh embodiment. FIG. 20 illustrates a drive pattern in which all the light emission surfaces of the planar light source device 300 uniformly emit light having the maximum luminance (white). The following description will particularly be made with a focus on the differences from FIG. 18.

The period $t_{2b}$, the period $t_{3b}$, and a part of the period $t_{4b}$ are set as the additional control periods of the area (1). In addition, a part of the period $t_{4b}$ and a part of the period $t_{5b}$ are set as the additional control periods of the area (2). In addition, a part of the period $t_{5b}$ and a part of the period $t_{6b}$ are set as the additional control periods of the area (3). In addition, a part of the period $t_{6b}$ is set as the additional control period of the area (4). In addition, a part of the period $t_{6b}$ is set as the additional control period of the area (5). In addition, a part of the period $t_{6b}$ is set as the additional control period of the area (6).

Namely, in the periods $t_{1a}$, $t_{2b}$, and $t_{3b}$ and a part of the period $t_{4b}$, the light modulation layer 314 of the area (1) of the planar light source device 300 is maintained in the scattering state. In addition, in the period $t_{2a}$, a part of the period $t_{4b}$, and a part of the period $t_{5b}$, the light modulation layer 314 of the area (2) of the planar light source device 300 is maintained in the scattering state. In addition, in the period $t_{3a}$, a part of the period $t_{5b}$, and a part of the period $t_{6b}$, the light modulation layer 314 of the area (3) of the planar light source device 300 is maintained in the scattering state. In addition, in the period $t_{4a}$ and a part of the period $t_{6b}$, the light modulation layer 314 of the area (4) of the planar light source device 300 is maintained in the scattering state. In addition, in the period $t_{5a}$ and a part of the period $t_{6b}$, the light modulation layer 314 of the area (5) of the planar light source device 300 is maintained in the scattering state. In addition, in the period $t_{6a}$ and a part of the period $t_{6b}$, the light modulation layer 314 of the area (6) of the planar light source device 300 is maintained in the scattering state.

The additional control periods are set so that all the areas emit light having the uniform maximum luminance (the light emitted from the areas is uniform in luminance by the addition of at least one additional control period). The display apparatus 100 refers to the light source lookup table and corrects the light attenuation that depends on the distance by changing the duration of the voltage application period. More specifically, the display apparatus 100 provides each area with at least one additional control period so that the luminance of the light to be emitted is improved to be uniform throughout the areas.

With this drive pattern, the display apparatus 100 increases the upper limit of the luminance of the light emitted from the planar light source device 300 by the above addition. Thus, while correcting the light attenuation that occurs depending on the distance between the target area and the side light source 302 by the duration of the period in which the target light modulation layer 314 is maintained in the scattering state, the display apparatus 100 causes the planar light source device 300 to emit light having a higher luminance. As a result, the display apparatus 100 prevents deterioration in image quality.

The display apparatus 100 sets idle periods as additional control periods in areas located farther from the side light source 302. Namely, the additional control periods are set in the areas whose control periods have already been ended (the areas on which the video scanning has already been performed). In this way, the display apparatus 100 prevents the planar light source device 300 from emitting light to pixels 201 while the video scanning is being performed on the pixels 201 of the image display panel 200.

Eighth Embodiment

Next, an eighth embodiment will be described. The same elements between the fifth and eighth embodiments are denoted by the same reference characters, and redundant description will be avoided. In the seventh embodiment, by driving the planar light source device 300 with a drive pattern in which the idle periods of the areas are set as the additional control periods of the areas, the display apparatus 100 eliminates the periods that do not contribute to the luminance of the light emitted and achieves emission of the light having a higher luminance. In the eighth embodiment, by using the light (leaked light) that is not emitted from the light guide member 310 while the light modulation layer 314 of an area is maintained in the scattering state, the entire luminance is further improved.

Figure 21:
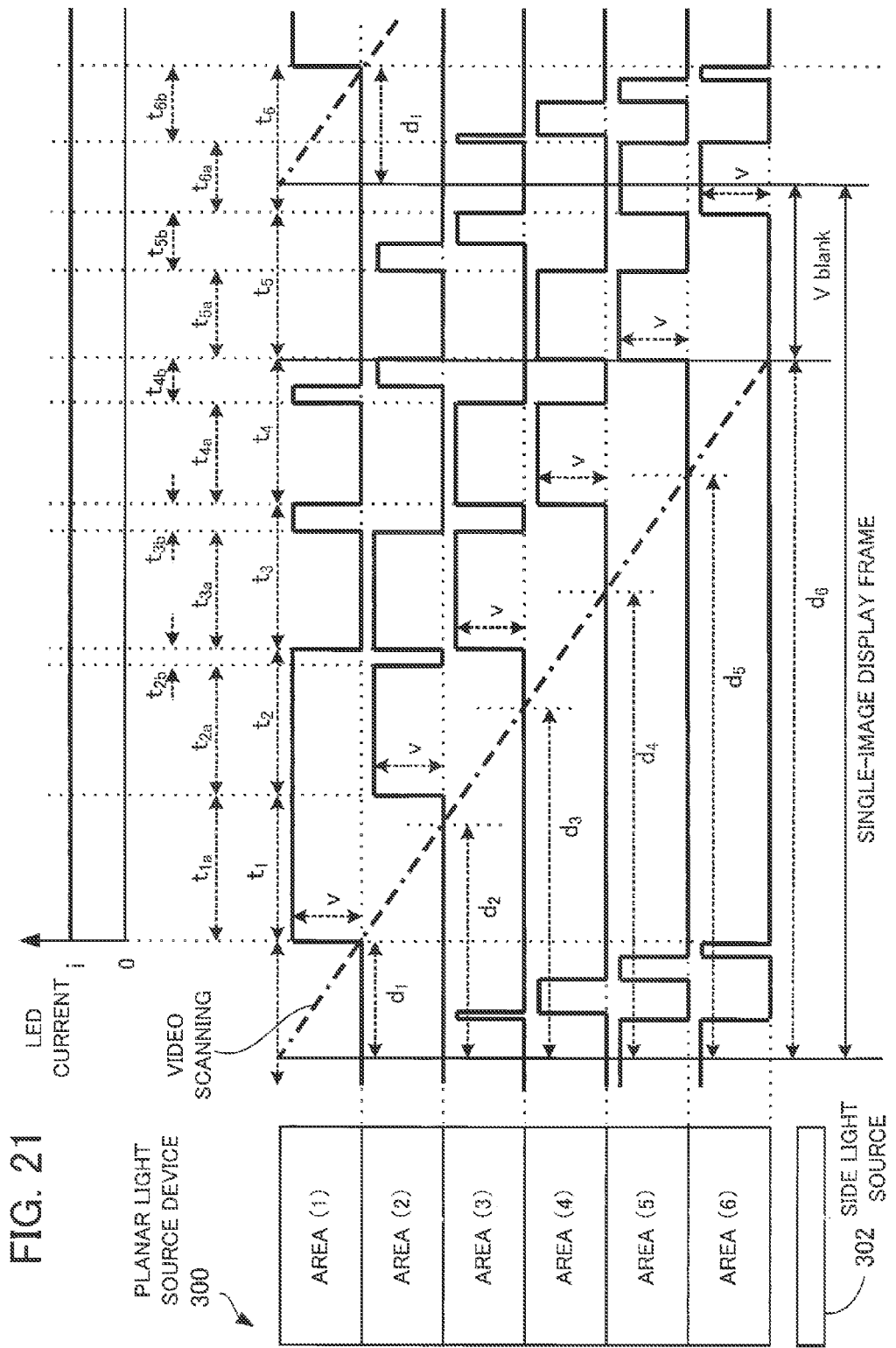
FIG. 21 illustrates a drive pattern of a planar light source device according to an eighth embodiment.

A specific drive pattern will be described with reference to FIG. 21. FIG. 21 illustrates a drive pattern of a planar light source device 300 according to the eighth embodiment. FIG. 21 illustrates a drive pattern in which all the light emission surfaces of the planar light source device 300 uniformly emit light having the maximum luminance (white). The following description will particularly be made with a focus on the differences from FIG. 20.

In FIG. 21, in the control period $t_{2a}$, the planar light source device 300 maintains the light modulation layer 314 of the area (2) and the light modulation layer 314 of the area (1), which is located farther from the side light source 302 than the area (2) is, in the scattering state. In addition, in the control period $t_{3a}$, the planar light source device 300 maintains the light modulation layer 314 of the area (3) and the light modulation layer 314 of the area (2), which is located farther from the side light source 302 than the area (3) is, in the scattering state. In addition, in the control period $t_{4a}$, the planar light source device 300 maintains the light modulation layer 314 of the area (4) and the light modulation layer 314 of the area (3), which is located farther from the side light source 302 than the area (4) is, in the scattering state.

In addition, in the control period $t_{5a}$, the planar light source device 300 maintains the light modulation layer 314 of the area (5) and the light modulation layer 314 of the area (4), which is located farther from the side light source 302 than the area (5) is, in the scattering state. In addition, in the control period $t_{6a}$, the planar light source device 300 maintains the light modulation layer 314 of the area (6) and the light modulation layer 314 of the area (5), which is located farther from the side light source 302 than the area (6) is, in the scattering state.

Normally, if the light modulation layer 314 of an area is maintained in the scattering state, the light guided to the area in the light guide member 310 is emitted from the area. However, part of the light guided to the area in the light guide member 310 could travel to the next area (the area next to the area maintained in the scattering state) without being emitted from the light guide member 310.

Thus, in FIG. 21, when bringing the light modulation layer 314 of the target area in the scattering state in the corresponding control period, the planar light source device 300 simultaneously brings the light modulation layer 314 of the area (the next area), which is located farther from the side light source 302 than the target area is, in the scattering state. In this way, even if all the light is not emitted in the control period of an individual area, the leaked light is emitted.

With this drive pattern, the display apparatus 100 increases the upper limit of the luminance of the light emitted from the planar light source device 300 by the amount of the light (leaked light) used, the light that could not be emitted from the light guide member 310 in the control period of an individual area.

When the light emitted from an area is set to a level other than the maximum luminance, there may be cases in which the light modulation layer 314 is not brought in the scattering state in a part of the control period of the area. In this case, the display apparatus 100 cannot use the leaked light in this period. However, in this period, since the light travels to the next area without being emitted, the area farther from the side light source 302 than the area is in the control period uses more light than the leaked light. Namely, the display apparatus 100 is able to expect improvement of the luminance by the use of the leaked light, without fail. Thus, with this drive pattern, the display apparatus 100 increases the upper limit of the luminance of the light emitted from the planar light source device 300 by the amount of the leaked light used.

In this way, while correcting the light attenuation that occurs depending on the distance between the side light source 302 and an individual area by the duration of the period in which the corresponding light modulation layer 314 is maintained in the scattering state, the display apparatus 100 causes the planar light source device 300 to emit light having a higher luminance. As a result, the display apparatus 100 prevents deterioration in image quality.

In addition, since the luminance of the leaked light is information unique to (depending on material and the like of) the display apparatus 100, the display apparatus 100 previously creates luminance distribution information in which leaked-light luminance values are set in the form of a table (a leaked-light lookup table) and stores the information in the light source data storage unit 122.

The drive pattern determination unit 123 determines the drive pattern of the planar light source device 300 by referring to the requested luminance values of the areas, the light source lookup table, and the leaked light lookup table. If a control period includes a period in which the corresponding light modulation layer 314 is not brought in the scattering state (a period in which no leaked light is usable), the drive pattern determination unit 123 may refer to the light source lookup table instead of the leaked-light lookup table as to such period.

As illustrated in FIG. 21, the area (6) located closest to the side light source 302 cannot use leaked light. Thus, the display apparatus 100 refers to the luminance lookup table and the leaked-light lookup table and corrects the improvement of the luminance corresponding to the improvement of the luminance made by the amount of the leaked light used by the other areas, by using the additional control period or the control period of the area (6). For example, if the upper limit of the luminance of the light emitted from the other areas is improved by using leaked light, the display apparatus 100 extends the duration of the additional control period set to the area (6) by the corresponding improvement.

Thus, since the leaked light cannot be used for the area (6), the display apparatus 100 corrects the luminance by using the additional control period or the control period of the area (6). In this way, the display apparatus 100 causes the areas to emit a uniform maximum luminance.

While the display apparatus 100 only uses the leaked light in the relevant control periods in FIG. 21, this is only an example. For example, the display apparatus 100 may use the leaked light in the relevant additional control periods in a similar manner.

When no additional control period is set (in the case illustrated in FIG. 18), the leaked light may be used in a similar manner. In this case, by extending the duration of the control period of the area (6) by the amount of the improvement of the upper limit of the luminance of the light emitted from the other areas, the improvement made by use of the leaked light, the display apparatus 100 causes the areas to emit and maintain a uniform maximum luminance.

Variation

Figure 22:
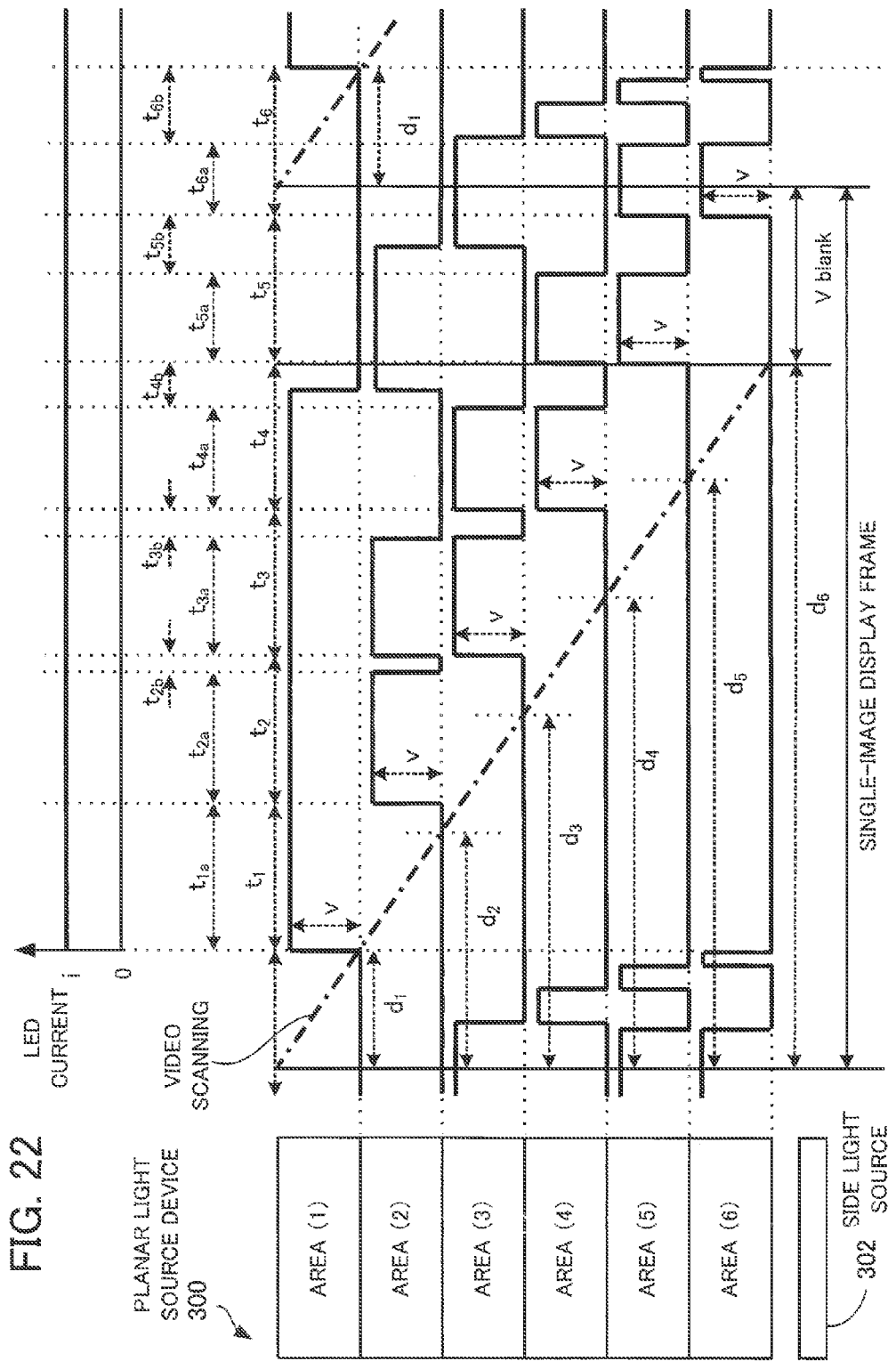
FIG. 22 illustrates a variation of the drive pattern of the planar light source device according to the eighth embodiment.

Next, a variation of the drive pattern in FIG. 21 will be described with reference to FIG. 22. FIG. 22 illustrates a variation of the drive pattern of the planar light source device 300 according to the eighth embodiment. FIG. 22 illustrates a drive pattern in which all the light emission surfaces of the planar light source device 300 uniformly emit light having the maximum luminance (white). The following description will particularly be made with a focus on the differences from FIG. 21.

In FIG. 22, the planar light source device 300 maintains the light modulation layer 314 of an individual area in the scattering state in a period between its additional control periods. More specifically, in FIG. 22, the planar light source device 300 continuously maintains the light modulation layer 314 of the area (1) in the scattering state in the periods $t_{2b}$, $t_{3a}$, $t_{3b}$, and $t_{4a}$ and a part of the period $t_{4b}$. In addition, the planar light source device 300 continuously maintains the light modulation layer 314 of the area (2) in the scattering state in a part of the period $t_{4b}$, the period $t_{5a}$, and a part of the period $t_{5b}$. In addition, the planar light source device 300 continuously maintains the light modulation layer 314 of the area (3) in the scattering state in a part of the period $t_{5b}$, the period $t_{6a}$, and a part of the period $t_{6b}$.

A period between additional control periods corresponds to the control period of another area, and in this period, leaked light is already being used. Thus, even if the display apparatus 100 brings the light modulation layer 314 of an area in the scattering state in this period, not so much improvement in luminance is expected. However, with this drive pattern, since the display apparatus 100 maintains the relevant light modulation layers 314 in the scattering state in a period between additional control periods, the light modulation layers 314 of the areas are less frequently switched between the scattering state and the non-scattering state. Namely, the display apparatus 100 controls the planar light source device 300 more easily.

Ninth Embodiment

Next, a ninth embodiment will be described. The same elements between the fifth and ninth embodiments are denoted by the same reference characters, and redundant description will be avoided. In the seventh embodiment, the planar light source device 300 maintains an area in the scattering state in its control period and idle periods of other areas, the idle periods set as additional control periods of the area. In the ninth embodiment, the display apparatus 100 performs easier control by driving the planar light source device 300 with a drive pattern in which a scattering control period includes the total duration of a control period and additional control periods.

Figure 23:
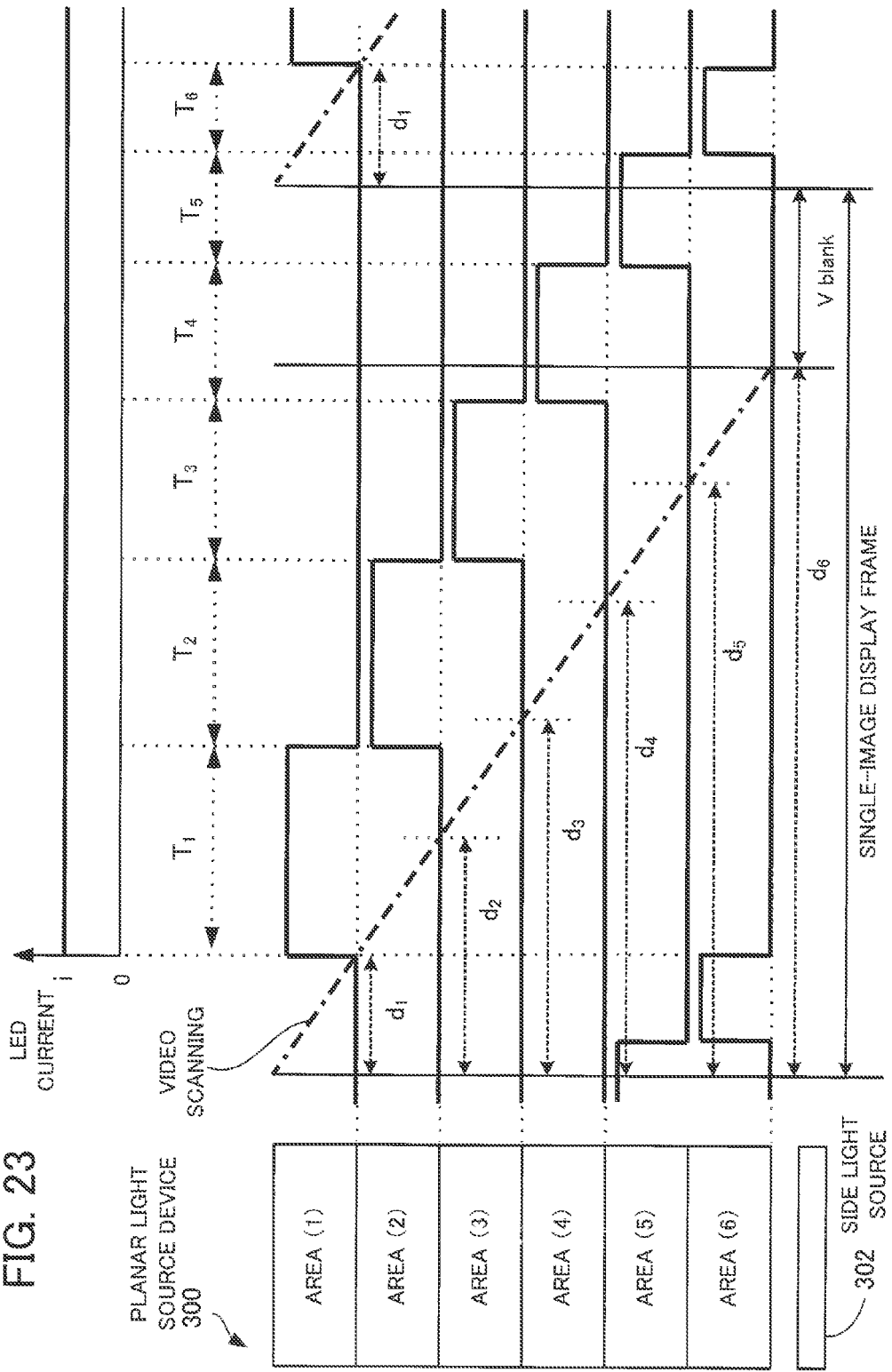
FIG. 23 illustrates a drive pattern of a planar light source device according to a ninth embodiment.

A specific drive pattern will be described with reference to FIG. 23. FIG. 23 illustrates a drive pattern of a planar light source device 300 according to the ninth embodiment. FIG. 23 illustrates a drive pattern in which all the light emission surfaces of the planar light source device 300 uniformly emit light having the maximum luminance (white). The following description will particularly be made with a focus on the differences from FIG. 20.

Periods $T_1$ to $T_6$ indicate the scattering control periods of the areas (1) to (6), respectively. The period $T_1$ indicates the total duration of the control period ($t_{1a}$) and the additional control periods (the periods $t_{2b}$ and $t_{3b}$ and a part of the period $t_{4b}$) of the area (1) illustrated in FIG. 20. The period $T_2$ indicates the total duration of the control period ($t_{2a}$) and the additional control periods (a part of the period $t_{4b}$ and a part of the period $t_{5b}$) of the area (2) illustrated in FIG. 20. The period $T_3$ indicates the total duration of the control period ($t_{3a}$) and the additional control periods (a part of the period $t_{5b}$ and a part of the period $t_{6b}$) of the area (3) illustrated in FIG. 20. The period $T_4$ indicates the total duration of the control period ($t_{4a}$) and the additional control period (a part of the period $t_{6b}$) of the area (4) illustrated in FIG. 20. The period $T_5$ indicates the total duration of the control period ($t_{5a}$) and the additional control period (a part of the period $t_{6b}$) of the area (5) illustrated in FIG. 20. The period $T_6$ indicates the total duration of the control period ($t_{6a}$) and the additional control period (a part of the period $t_{6b}$) of the area (6) illustrated in FIG. 20. Namely, each of the areas is provided with a scattering control period having a duration that depends on the distance from the side light source 302 so that no idle period is caused in the scattering control period.

By generating an electric field corresponding to the voltage difference v in the light modulation layer 314 of the area (1) in the period $T_1$, the planar light source device 300 maintains the light modulation layer 314 in the scattering state in the period $T_1$. In addition, the planar light source device 300 allows the light guide member 310 to receive the light corresponding to the LED current i. Likewise, by generating the electric field corresponding to the voltage difference v in the light modulation layer 314 of the area (2) in the period $T_2$, the planar light source device 300 maintains the light modulation layer 314 in the scattering state in the period $T_2$. In addition, the planar light source device 300 allows the light guide member 310 to receive the light corresponding to the LED current i. Likewise, by generating the electric field corresponding to the voltage difference v in the light modulation layers 314 of the areas (3) to (6) in the periods $T_3$ to $T_6$, the planar light source device 300 maintains the light modulation layers 314 in the scattering state in the periods $T_3$ to $T_6$, respectively. In addition, the planar light source device 300 allows the light guide member 310 to receive the light corresponding to the LED current i.

With this drive pattern, the light modulation layers 314 of the areas of the display apparatus 100 are less frequently switched between the scattering state and the non-scattering state. Namely, the display apparatus 100 controls the planar light source device 300 more easily.

Tenth Embodiment

Next, a tenth embodiment will be described. The same elements between the fifth and tenth embodiments are denoted by the same reference characters, and redundant description will be avoided. In the ninth embodiment, the display apparatus 100 performs easier control by driving the planar light source device 300 with a drive pattern in which a scattering control period includes the total duration of a control period and additional control periods. In the tenth embodiment, by using the light (leaked light) that is not emitted from the light guide member 310 while the light modulation layer 314 of an area is maintained in the scattering state, the entire luminance is further improved.

A specific drive pattern will be described with reference to FIG. 24. FIG. 24 illustrates a drive pattern of a planar light source device 300 according to the tenth embodiment. FIG. 24 illustrates a drive pattern in which all the light emission surfaces of the planar light source device 300 uniformly emit light having the maximum luminance (white). The following description will particularly be made with a focus on the differences from FIG. 22.

In FIG. 24, in the scattering control period $T_2$, the planar light source device 300 maintains the light modulation layer 314 of the area (2) and the light modulation layer 314 of the area (1), which is located farther from the side light source 302 than the area (2) is, in the scattering state. In the scattering control period $T_3$, the planar light source device 300 maintains the light modulation layer 314 of the area (3) and the light modulation layers 314 of the areas (1) and (2), which are located farther from the side light source 302 than the area (3) is, in the scattering state. In the scattering control period $T_4$, the planar light source device 300 maintains the light modulation layer 314 of the area (4) and the light modulation layers 314 of the areas (1) to (3), which are located farther from the side light source 302 than the area (4) is, in the scattering state. In the period $T_{5a}$ in the scattering control period $T_5$ (in the period in which no video scanning is performed), the planar light source device 300 maintains the light modulation layer 314 of the area (5) and the light modulation layers 314 of the areas (1) to (4), which are located farther from the side light source 302 than the area (5) is, in the scattering state. In the period $T_{5b}$ in the scattering control period $T_5$ (in the period in which the video scanning on the area (1) is performed), the planar light source device 300 maintains the light modulation layer 314 of the area (5) and the light modulation layers 314 of the areas (2) to (4), which are located farther from the side light source 302 than the area (5) is, in the scattering state. In the scattering control period $T_6$, the planar light source device 300 maintains the light modulation layer 314 of the area (6) and the light modulation layers 314 of the areas (2) to (5), which are located farther from the side light source 302 than the area (6) is, in the scattering state.

Namely, in the scattering control period of an area, the light modulation layers 314 of other areas, which are located farther from the side light source 302 than the area is and on which no vide scanning is being performed, could simultaneously be maintained in the scattering state. In this way, the display apparatus 100 emits the light (leaked light) that is not emitted in the scattering control periods of the respective areas.

With this drive pattern, the display apparatus 100 increases the upper limit of the luminance of the light emitted from the planar light source device 300 by the amount of the light (leaked light) used, the light having not been emitted from the light guide member 310 in the scattering control periods of the respective areas.

In addition, since the luminance of the leaked light is information unique to (depending on material and the like of) the display apparatus 100, the display apparatus 100 previously creates luminance distribution information in which leaked-light luminance values are set in the form of a table (a leaked-light lookup table) and stores the information in the light source data storage unit 122.

The drive pattern determination unit 123 determines the drive pattern of the planar light source device 300 by referring to the requested luminance values of the areas, the light source lookup table, and the leaked-light lookup table. If a scattering control period includes a period in which the corresponding light modulation layer 314 is not brought in the scattering state (a period in which no leaked light is usable), the drive pattern determination unit 123 may refer to the light source lookup table instead of the leaked-light lookup table as to such period.

As illustrated in FIG. 24, the area (6) located closest to the side light source 302 cannot use leaked light. Thus, the display apparatus 100 refers to the luminance lookup table and the leaked-light lookup table and corrects the improvement of the luminance corresponding to the improvement of the luminance made by the amount of the leaked light used by the other areas, by using the scattering control period of the area (6). For example, if the upper limit of the luminance of the light emitted from the other areas is improved by using leaked light, the display apparatus 100 extends the duration of the scattering control period set to the area (6) by the corresponding improvement.

Thus, since the leaked light cannot be used for the area (6), the display apparatus 100 corrects the luminance by using the scattering control period of the area (6). In this way, the display apparatus 100 causes the areas to emit a uniform maximum luminance.

In the above description, the light modulation layer 314 of an area is maintained in the scattering state in the corresponding scattering control period and in the scattering control period of another area located closer to the side light source 302 than the area is, except the period in which the video scanning is being performed on the area. However, other modes are also applicable. For example, if leaked light is already being used in another area, even if the display apparatus 100 brings the light modulation layer 314 of an area in the scattering state in this period, not so much improvement in luminance is expected. Thus, the light modulation layer 314 of an area may be maintained in the scattering state only in the corresponding scattering control period and in a period in which leaked light is used without fail (in the scattering control period of an area next to the area on the side light source 302 side).

The above processing functions may be realized by a computer. In this case, a program in which the processing contents corresponding to the functions of the display apparatus are written is provided. The processing functions are realized on the computer by causing the computer to execute the program. The program in which the processing contents are written may be recorded in a computer-readable recording medium. Examples of the computer-readable recording medium include a magnetic storage device, an optical disc, a magneto-optical recording medium, and a semiconductor memory. Examples of the magnetic storage device include a hard disk drive (HDD), a flexible disk (FD), and a magnetic tape. Examples of the optical disc include a digital versatile disc (DVD), a DVD-RAM, a compact disc (CD) ROM, and a CD-R (Recordable)/RW (Rewritable). Examples of the magneto-optical recording medium include a magneto-optical disk (MO).

One way to distribute the program is to sell portable recording media such as DVDs or CD-ROMs in which the program is recorded. In addition, the program may be stored in a storage device of a server computer and forwarded to other computers from the server computer via a network.

For example, a computer that executes the program stores the program recorded in a portable recording medium or forwarded from the server computer in a storage device of the computer. Next, the computer reads the program from the storage device and executes processing in accordance with the program. The computer may directly read the program from the portable recording medium and perform processing in accordance with the program. In addition, each time the computer receives a program from the server computer connected via the network, the computer may execute processing in accordance with the received program.

At least a part of the above processing functions may be realized by an electric circuit such as a digital signal processor (DSP), an application specific integrated circuit (ASIC), or a programmable logic device (PLD).

Various variations and modifications could be made by a person skilled in the art within the scope of the concept of the present technique, and it should be understood that such variations and modifications are included in the scope of the present technique. For example, as needed, a person skilled in the art could add or remove a constituent element of any one of the above embodiments or make some design change to any one of the above embodiments. For example, as needed, a person skilled in the art could add or remove a step or change some conditions of any one of the above embodiments. However, as long as these modifications are within the gist of the present technique, it should be understood that these modifications are included in the scope of the present technique.

In addition, the modes in the above embodiments provide other operational advantages, and it should be understood that the advantages that are apparent from the present description and the advantages that could be arrived at by a person skilled in the art as needed are included in the advantages certainly provided by the present technique.

(1) In one aspect of the technique disclosed herein, there is provided a display apparatus including: an image display panel; a light source device that includes a light source that emits light, and a light guide member that is arranged on the back surface side of the image display panel as seen from the display surface of the image display panel, receives the light via a side surface of the light guide member with respect to a surface of the light guide member, the surface facing the image display panel, and has a plurality of divided areas arranged in a direction in which the light travels, each of the areas including a light modulation layer brought in a transmission state in which the light is transmitted through the light modulation layer or in a scattering state in which the light is scattered in the light modulation layer; and a control device that brings the light modulation layers of the areas in the scattering state in respective scattering control periods temporally different from each other and that controls, when bringing any one of the light modulation layers in the scattering state, the light source device with a drive pattern based on a distance between the side surface and the area including the one light modulation layer.

(2) In one aspect of the technique disclosed herein, there is provided the display apparatus according to (1), wherein, when one of the areas emits light having less luminance to the image display panel than another of the areas because the one area is located farther from the side surface than the another area is, the control device corrects the less luminance by increasing the duration of a scattering control period in which the control device maintains the light modulation layer of the one area in the scattering state.

(3) In one aspect of the technique disclosed herein, there is provided the display apparatus according to (1) or (2), wherein, when one of the areas emits light having less luminance to the image display panel than another of the areas because the one area is located farther from the side surface than the another area is, the control device corrects the less luminance by increasing luminance of the light emitted from the light source.

(4) In one aspect of the technique disclosed herein, there is provided the display apparatus according to any one of (1) to (3), wherein, when one of the areas emits light having less luminance to the image display panel than another of the areas because the one area is located farther from the side surface than the another area is, the control device corrects the less luminance by increasing a scattering degree of the scattering state of the light modulation layer of the one area.

(5) In one aspect of the technique disclosed herein, there is provided the display apparatus according to any one of (1) to (4), wherein the control device includes a light source lookup table in which luminance of light emitted from an individual area when the control device controls the light source device with a predetermined drive pattern is stored, and wherein the control device controls the light source device, based on the light source lookup table.

(6) In one aspect of the technique disclosed herein, there is provided a display apparatus including: an image display panel; a light source device that includes a light source that emits light, and a light guide member that is arranged the back surface side of the image display panel as seen from the display surface of the image display panel, receives the light via a side surface of the light guide member with respect to a surface of the light guide member, the surface facing the image display panel, and has a plurality of divided areas arranged in a direction in which the light travels, each of the areas including a light modulation layer brought in a transmission state in which the light is transmitted through the light modulation layer or in a scattering state in which the light is scattered in the light modulation layer; and a control device that brings the light modulation layers of the areas in the scattering state in respective scattering control periods temporally different from each other, causes, as needed, the scattering state of the light modulation layer of one of the areas to temporally overlap a part of the scattering control period of another of the areas located farther from the side surface than the one area is, and controls, when bringing any one of the light modulation layers in the scattering state, the light source device with a drive pattern based on a distance between the side surface and the area including the one light modulation layer.

(7) In one aspect of the technique disclosed herein, there is provided the display apparatus according to (6), wherein, when increasing luminance emitted from one of the areas to the image display panel than luminance emitted from the areas around the one area to the image display panel, the control device causes the scattering state of the light modulation layer of the one area to temporally overlap a part of the scattering control period of the light modulation layer of an area located farther from the side surface than the one area is.

(8) In one aspect of the technique disclosed herein, there is provided the display apparatus according to (6) or (7), wherein the control device includes an analysis unit that analyzes an image signal supplied to the image display panel, and wherein, based on an analysis result of the image signal obtained by the analysis unit, the control device determines the one area whose scattering state of the light modulation layer is caused to temporally overlap the part of the scattering control period of the light modulation layer of the area located farther than the side surface than the one area is.

(9) In one aspect of the technique disclosed herein, there is provided the display apparatus according to any one of (6) to (8), wherein, when causing the light modulation layer of the one area to overlap the part of the scattering control period of the light modulation layer of the area located farther from the side surface than the one area is and to be in the scattering state, the control device alternately brings the light modulation layer of the one area in the scattering state and the transmission state at predetermined intervals during the overlapping.

(10) In one aspect of the technique disclosed herein, there is provided the display apparatus according to any one of (6) to (9), wherein, when causing the light modulation layer of the one area to overlap the part of the scattering control period of the light modulation layer of the area located farther from the side surface than the one area is and to be in the scattering state, the control device decreases a scattering degree of the scattering state of the light modulation layer of the one area during the overlapping to be lower than a scattering degree of the scattering state of the light modulation layer in the scattering control period.

(11) In one aspect of the technique disclosed herein, there is provided a display apparatus including: an image display panel that sequentially performs display scanning in a first direction; a light source device that includes a light source that emits light, and a light guide member that is arranged on the back surface side of the image display panel as seen from the display surface of the image display panel, receives the light via a side surface of the light guide member with respect to a surface of the light guide member, the surface facing the image display panel, and has a plurality of divided areas arranged in the first direction, each of the areas including a light modulation layer that guides the light in a second direction opposite to the first direction and that is brought in a transmission state in which the light is transmitted through the light modulation layer or in a scattering state in which the light is scattered in the light modulation layer; and a control device that brings, based on intensity of the light emitted from the areas to the image display panel in respective scattering control periods that are temporally different from each other and that are given to the respective areas in the first direction, the light modulation layer of one of the areas in the scattering state for the duration of the period based on a distance between the side surface and the one area.

(12) In one aspect of the technique disclosed herein, there is provided the display apparatus according to (11), wherein the plurality of areas include a first area and a second area located farther from the side surface than the first area is, and wherein the control device brings the light modulation layer of the first or second area in the scattering state in an idle period which is included in the scattering control period of the first area and in which the light modulation layer of the first area is not in the scattering state and evenly increases the upper limit of intensity of the light emitted from each of the areas to the image display panel.

(13) In one aspect of the technique disclosed herein, there is provided the display apparatus according to (11), wherein the plurality of areas include a first area and a second area located farther from the side surface than the first area is, and wherein the control device brings the light modulation layers of the first and second areas in the scattering state in the scattering control period of the first area.

(14) In one aspect of the technique disclosed herein, there is provided the display apparatus according to (11), wherein each of the areas emits the same intensity of light to the image display panel when the control device brings the light modulation layers of the areas in the scattering state in the respective scattering control periods.

(15) In one aspect of the technique disclosed herein, there is provided a display apparatus including: an image display panel; a light source device that includes a light source that emits light, and a light guide member that is arranged on the back surface side of the image display panel as seen from the display surface of the image display panel, receives the light via a side surface of the light guide member with respect to a surface of the light guide member, the surface facing the image display panel, and has a plurality of divided areas arranged in a direction in which the light travels, each of the areas including a light modulation layer that is brought in a transmission state in which the light is transmitted through the light modulation layer or in a scattering state in which the light is scattered in the light modulation layer; and a control device that brings, based on intensity of the light emitted from the areas to the image display panel in respective scattering control periods temporally different from each other, the light modulation layer of one of the areas in the scattering state for the duration of the period based on a distance between the side surface and the one area and that stops emission of the light from the light source when the control device maintains the light modulation layers of the areas in a state other than the scattering state in the respective scattering control periods.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus comprising:
an image display panel;
a light source device that includes
   a light source that emits light, and
   a light guide member that is arranged on a back surface side of the image display panel as seen from a display surface of the image display panel, receives the light via a side surface of the light guide member with respect to a surface of the light guide member, the surface facing the image display panel, and has a plurality of divided areas arranged in a direction in which the light travels, each of the areas including a light modulation layer brought in a transmission state in which the light is transmitted through the light modulation layer or in a scattering state in which the light is scattered in the light modulation layer; and
a control device that brings the light modulation layers of the areas in the scattering state in respective scattering control periods temporally different from each other and that controls, when bringing any one of the light modulation layers in the scattering state, the light source device with a drive pattern based on a distance between the side surface and the area including said one light modulation layer.

2. The display apparatus according to claim 1,
wherein, when one of the areas emits light having less luminance to the image display panel than another of the areas because said one area is located farther from the side surface than said another area is, the control device corrects the less luminance by increasing the duration of a scattering control period in which the control device maintains the light modulation layer of said one area in the scattering state.

3. The display apparatus according to claim 1,
wherein, when one of the areas emits light having less luminance to the image display panel than another of the areas because said one area is located farther from the side surface than said another area is, the control device corrects the less luminance by increasing luminance of the light emitted from the light source.

4. The display apparatus according to claim 1,
wherein, when one of the areas emits light having less luminance to the image display panel than another of the areas because said one area is located farther from the side surface than said another area is, the control device corrects the less luminance by increasing a scattering degree of the scattering state of the light modulation layer of said one area.

5. The display apparatus according to claim 1,
wherein the control device includes a light source lookup table in which luminance of light emitted from an individual area when the control device controls the light source device with a predetermined drive pattern is stored, and
wherein the control device controls the light source device, based on the light source lookup table.

6. A display apparatus comprising:
an image display panel;
a light source device that includes
   a light source that emits light, and a light guide member that is arranged on a back surface side of the image display panel as seen from a display surface of the image display panel, receives the light via a side surface of the light guide member with respect to a surface of the light guide member, the surface facing the image display panel, and has a plurality of divided areas arranged in a direction in which the light travels, each of the areas including a light modulation layer brought in a transmission state in which the light is transmitted through the light modulation layer or in a scattering state in which the light is scattered in the light modulation layer; and a control device that brings the light modulation layers of the areas in the scattering state in respective scattering control periods temporally different from each other, causes, as needed, the scattering state of the light modulation layer of one of the areas to temporally overlap a part of the scattering control period of another of the areas located farther from the side surface than said one area is, and controls, when bringing any one of the light modulation layers in the scattering state, the light source device with a drive pattern based on a distance between the side surface and the area including said one light modulation layer.

7. The display apparatus according to claim 6,
wherein, when increasing luminance emitted from one of the areas to the image display panel than luminance emitted from the areas around said one area to the image display panel, the control device causes the scattering state of the light modulation layer of said one area to temporally overlap a part of the scattering control period of the light modulation layer of an area located farther from the side surface than said one area is.

8. The display apparatus according to claim 6,
wherein the control device includes an analysis unit that analyzes an image signal supplied to the image display panel, and
wherein, based on an analysis result of the image signal obtained by the analysis unit, the control device determines said one area whose scattering state of the light modulation layer is caused to temporally overlap the part of the scattering control period of the light modulation layer of the area located farther than the side surface than said one area is.

9. The display apparatus according to claim 6,
wherein, when causing the light modulation layer of said one area to overlap the part of the scattering control period of the light modulation layer of the area located farther from the side surface than said one area is and to be in the scattering state, the control device alternately brings the light modulation layer of said one area in the scattering state and the transmission state at predetermined intervals during the overlapping.

10. The display apparatus according to claim 6,
wherein, when causing the light modulation layer of said one area to overlap the part of the scattering control period of the light modulation layer of the area located farther from the side surface than said one area is and to be in the scattering state, the control device decreases a scattering degree of the scattering state of the light modulation layer of said one area during the overlapping to be lower than a scattering degree of the scattering state of the light modulation layer in the scattering control period.

11. A display apparatus comprising:
an image display panel that sequentially performs display scanning in a first direction;
a light source device that includes
a light source that emits light, and
a light guide member that is arranged on a back surface side of the image display panel as seen from a display surface of the image display panel, receives the light via a side surface of the light guide member with respect to a surface of the light guide member, the surface facing the image display panel, and has a plurality of divided areas arranged in the first direction, each of the areas including a light modulation layer that guides the light in a second direction opposite to the first direction and that is brought in a transmission state in which the light is transmitted through the light modulation layer or in a scattering state in which the light is scattered in the light modulation layer; and
a control device that brings, based on intensity of the light emitted from the areas to the image display panel in respective scattering control periods that are temporally different from each other and that are given to the respective areas in the first direction, the light modulation layer of one of the areas in the scattering state for the duration of the period based on a distance between the side surface and said one area.

12. The display apparatus according to claim 11,
wherein the plurality of areas include a first area and a second area located farther from the side surface than the first area is, and
wherein the control device brings the light modulation layer of the first or second area in the scattering state in an idle period which is included in the scattering control period of the first area and in which the light modulation layer of the first area is not in the scattering state and evenly increases the upper limit of intensity of the light emitted from each of the areas to the image display panel.

13. The display apparatus according to claim 11,
wherein the plurality of areas include a first area and a second area located farther from the side surface than the first area is, and
wherein the control device brings the light modulation layers of the first and second areas in the scattering state in the scattering control period of the first area.

14. The display apparatus according to claim 11,
wherein each of the areas emits the same intensity of light to the image display panel when the control device brings the light modulation layers of the areas in the scattering state in the respective scattering control periods.

15. A display apparatus comprising:
an image display panel;
a light source device that includes
a light source that emits light, and
a light guide member that is arranged on a back surface side of the image display panel as seen from a display surface of the image display panel, receives the light via a side surface of the light guide member with respect to a surface of the light guide member, the surface facing the image display panel, and has a plurality of divided areas arranged in a direction in which the light travels, each of the areas including a light modulation layer that is brought in a transmission state in which the light is transmitted through the light modulation layer or in a scattering state in which the light is scattered in the light modulation layer; and a control device that brings, based on intensity of the light emitted from the areas to the image display panel in respective scattering control periods temporally different from each other, the light modulation layer of one of the areas in the scattering state for the duration of the period based on a distance between the side surface and said one area and that stops emission of the light from the light source when the control device maintains the light modulation layers of the areas in a state other than the scattering state in the respective scattering control periods.

* * * * *